(12) United States Patent
Kawabe

(10) Patent No.: US 11,328,635 B2
(45) Date of Patent: May 10, 2022

(54) ILLUSION APPARATUS, VIDEO GENERATION APPARATUS, OBJECT GENERATION DEVICE, OBJECT SET, OBJECT, ILLUSION METHOD, VIDEO GENERATION METHOD, AND PROGRAM

(71) Applicant: NIPPON TELEGRAPH AND TELEPHONE CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/049,665

(22) PCT Filed: Apr. 9, 2019

(86) PCT No.: PCT/JP2019/015420
§ 371 (c)(1),
(2) Date: Oct. 22, 2020

(87) PCT Pub. No.: WO2019/208194
PCT Pub. Date: Oct. 31, 2019

(65) Prior Publication Data
US 2021/0256887 A1    Aug. 19, 2021

(30) Foreign Application Priority Data
Apr. 26, 2018   (JP) .............................. JP2018-085303

(51) Int. Cl.
*G09G 3/00* (2006.01)
*G09G 5/10* (2006.01)
*G09G 5/377* (2006.01)

(52) U.S. Cl.
CPC ............. *G09G 3/004* (2013.01); *G09G 3/003* (2013.01); *G09G 5/10* (2013.01); *G09G 5/377* (2013.01)

(58) Field of Classification Search
None
See application file for complete search history.

(56) References Cited

U.S. PATENT DOCUMENTS 6,661,425 B1 *   12/2003   Hiroaki .................. G09G 3/003
                                                                345/1.1
2011/0109723 A1 *   5/2011   Ashbey .................. G06T 11/00
                                                                348/44

(Continued)

OTHER PUBLICATIONS

Kanda, et al., "Paint Tool For Trick Art Production Using Motion Illusion", Mar. 13, 2013, Proceedings of the 75th National Convention, 2013 (1), 4-867 to 4-868 (Year: 2013).*

(Continued)

*Primary Examiner* — Kirk W Hermann

(57) ABSTRACT

An object including a final target that is equivalent to an object obtained by a superposition of three objects of a target, a dark object, and a light object with approximately the same shape, a superposition of two objects of a target and a dark object with approximately the same shape or approximately similar shapes, or a superposition of two objects of a target and a light object with approximately the same shape or approximately similar shapes is arranged in a background of which luminance periodically varies over time. However, luminance of the dark object is lower than luminance of the target, luminance of the light object is higher than the luminance of the target, and the superposition described above is an incomplete superposition in which a part of the dark object and/or a part of the light object is hidden by the target.

12 Claims, 25 Drawing Sheets

(56) References Cited

U.S. PATENT DOCUMENTS

| | | | | |
|---|---|---|---|---|
| 2013/0250246 A1* | 9/2013 | Shapiro | ............... | A61B 3/032 |
| | | | | 351/246 |
| 2014/0078170 A1* | 3/2014 | Ohki | ............... | G06T 5/003 |
| | | | | 345/606 |
| 2014/0213930 A1* | 7/2014 | Mori | ............... | G06K 9/0061 |
| | | | | 600/558 |
| 2014/0362258 A1* | 12/2014 | Ichikawa | ............ | H04N 5/23229 |
| | | | | 348/240.1 |

OTHER PUBLICATIONS

Gregory et al., "Visual Dissociations Of Movement, Position, and Stereo Depth: Some Phenomenal Phenomena", 1983, The Quarterly Journal Of Experimental Psychology: A Human Experimental Psychology, 35 (Pt1), 217-237 (Year: 1983).*

Kanda et al. (2012) "Paint Tool for Trick-Art Production," FIT2012 Forum on Information Technology, 3rd Volume, pp. 193-196 with its English translation generated by computer.

Gregory et al. (1983) "Visual dissociations of movement, position, and stereo depth: some phenomenal phenomena," The Quarterly Journal of Experimental Psychology: A Human Experimental Psychology, 35 (Pt1), 217-237.

* cited by examiner

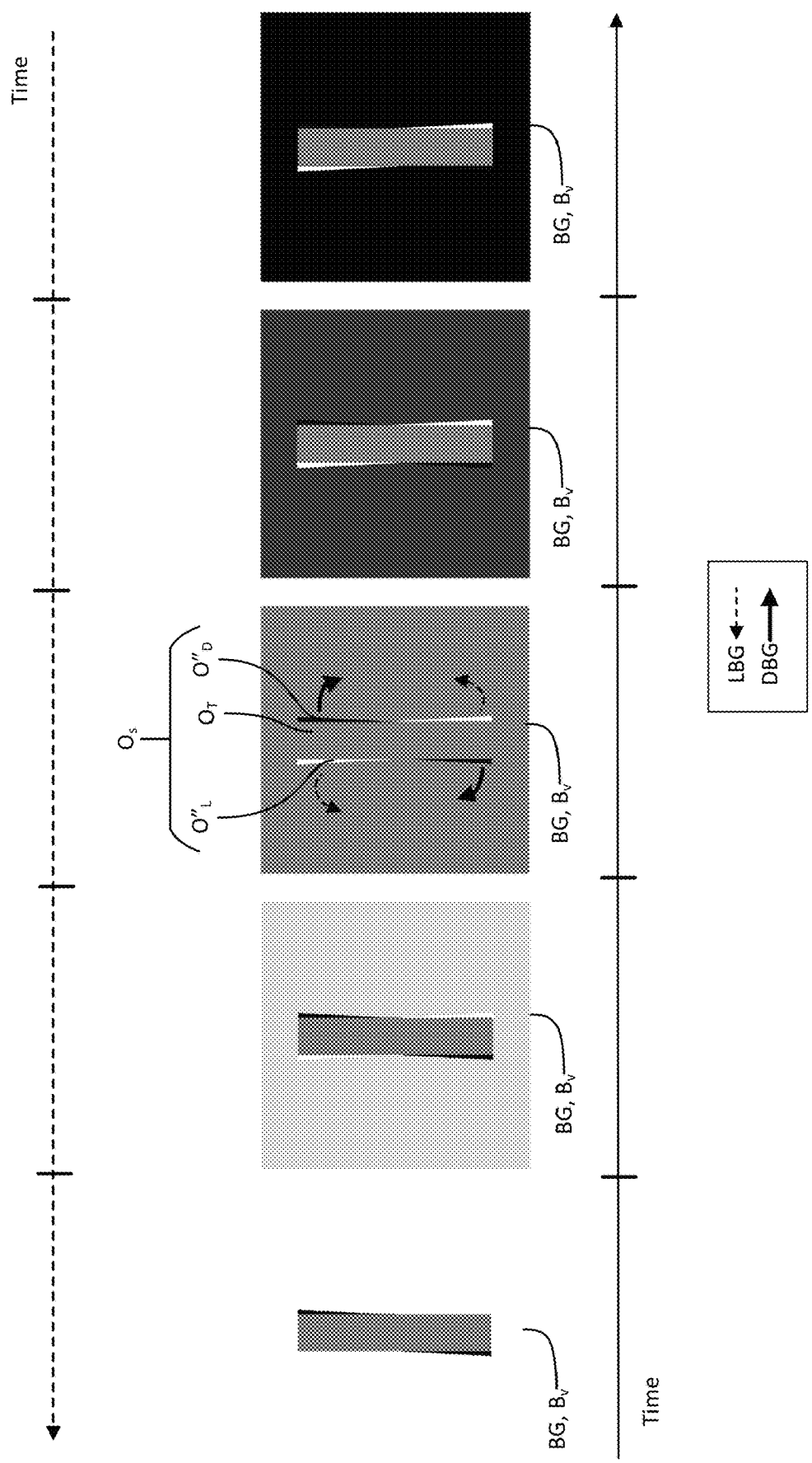

ILLUSION APPARATUS, VIDEO GENERATION APPARATUS, OBJECT GENERATION DEVICE, OBJECT SET, OBJECT, ILLUSION METHOD, VIDEO GENERATION METHOD, AND PROGRAM

CROSS-REFERENCE TO RELATED APPLICATIONS

This application is a U.S. 371 Application of International Patent Application No. PCT/JP2019/015420, filed on 9 Apr. 2019, which application claims priority to and the benefit of JP Application No. 2018-085303, filed on 26 Apr. 2018, the disclosures of which are hereby incorporated herein by reference in their entireties.

TECHNICAL FIELD

The present invention relates to a technique for causing an illusory effect in which a target (a real object or an object in an image) which is not actually moving appears to be moving.

BACKGROUND ART

A phenomenon is known in which, based on a luminance distribution of a contour of a target that is an object in an image and a time variation of background luminance, the target that is not actually moving appears to be moving (for example, refer to NPL1). Specifically, among two straight sides that are parallel to each other in a gray square shape, a stripe region with a certain width of which luminance is higher than the shape is added outside of one of the sides and a stripe region with a certain width of which luminance is lower than the shape is added outside of the other side. However, widths of the stripe regions are the same. When luminance of a background of the shape to which the stripe regions have been added is varied, the shape that is supposed to be stationary appears to move in a direction perpendicular to the sides to which the stripe regions have been added.

CITATION LIST

Non Patent Literature

[NPL1] Gregory, R. L., & Heard, P. F. (1983). Visual dissociations of movement, position, and stereo depth: some phenomenal phenomena. The Quarterly Journal of Experimental Psychology. A, Human Experimental Psychology, 35 (Ptl), 217-237.

SUMMARY OF THE INVENTION

Technical Problem

However, there is no known technique for creating an illusion that a target having an arbitrary contour shape appears to be moving.

The present invention has been made in consideration of such circumstances and an object thereof is to provide a technique for creating an illusion that a target which has an arbitrary contour shape and which is actually not moving appears to be moving.

Means for Solving the Problem

An object including a final target that is equivalent to an object obtained by a superposition of three objects of a target, a dark object, and a light object with approximately the same shape, a superposition of two objects of a target and a dark object with approximately the same shape or approximately similar shapes, or a superposition of two objects of a target and a light object with approximately the same shape or approximately similar shapes is arranged in a background of which luminance periodically varies over time. However, luminance of the dark object is lower than luminance of the target, luminance of the light object is higher than the luminance of the target, and the superposition described above is an incomplete superposition in which a part of the dark object and/or a part of the light object is hidden by the target.

Effects of the Invention

Accordingly, an illusion that a target which has an arbitrary contour shape and which is actually not moving appears to be moving can be created.

BRIEF DESCRIPTION OF DRAWINGS

FIGS. 9A and 9B are diagrams for illustrating an illusory effect produced by a final target and a background of which luminance periodically varies.

DESCRIPTION OF EMBODIMENTS

Hereinafter, embodiments of the present invention will be described with reference to the drawings.

First Embodiment

In a first embodiment, a technique for creating an illusion (a parallel movement illusion) with respect to a target having a complex contour shape as though the target is moving in parallel in a specific direction despite the target not actually moving will be described.

<Configuration>

Figure 1:
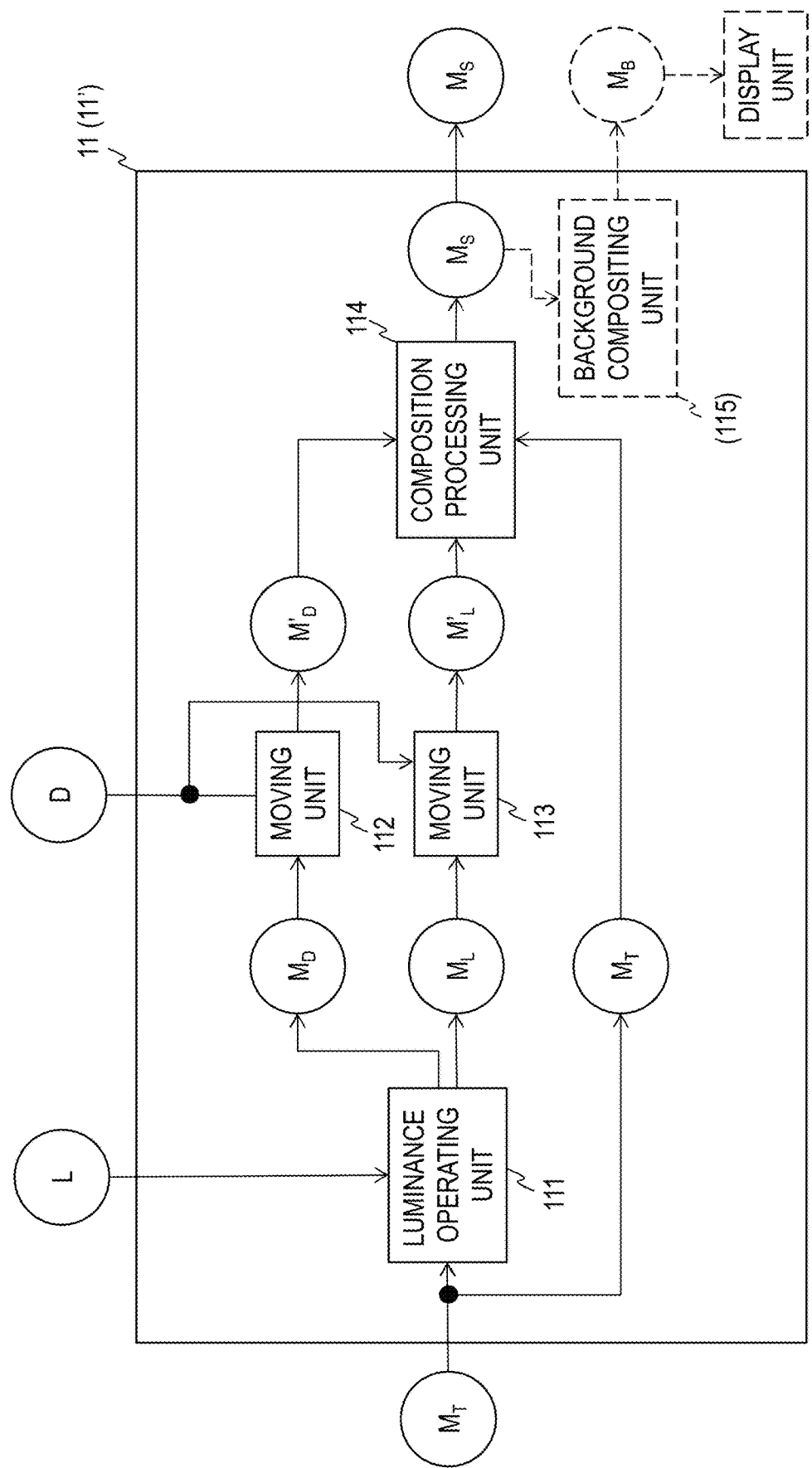
FIG. 1 is a block diagram illustrating a functional configuration of an image generation apparatus according to an embodiment.
Figure 2:
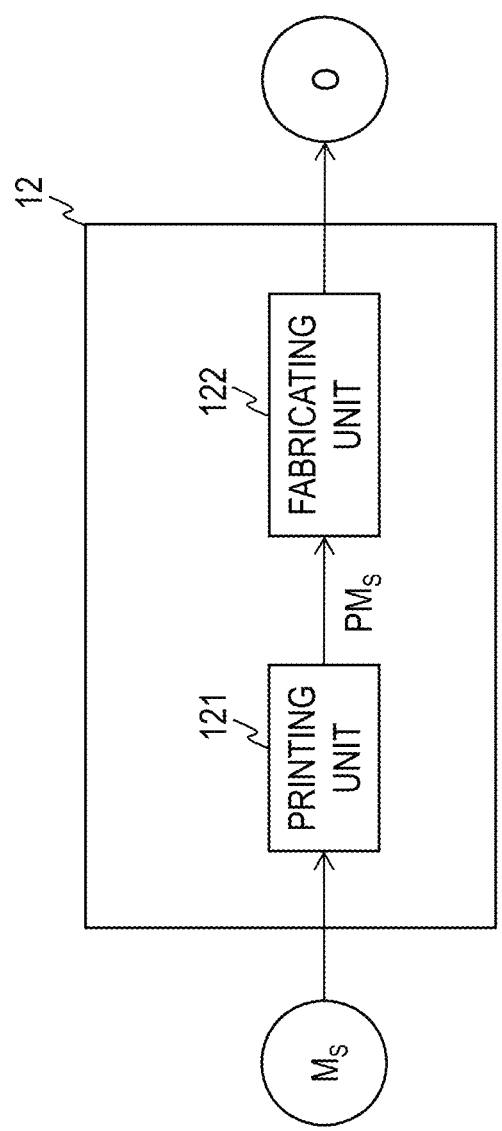
FIG. 2 is a block diagram illustrating a functional configuration of an object generation apparatus according to an embodiment.
Figure 3:
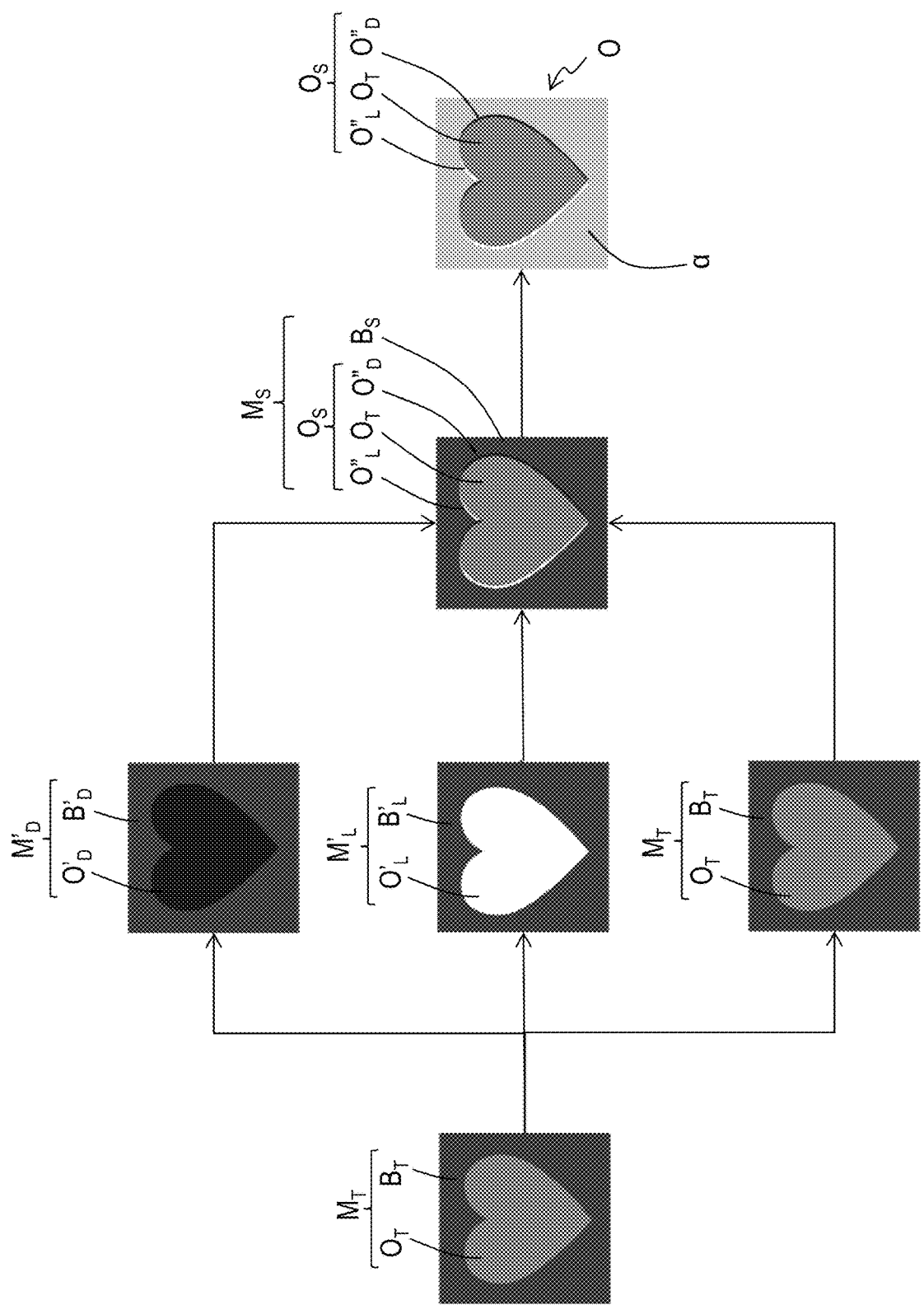
FIG. 3 is a diagram illustrating a part of an input/output image of each process in an image generation method and an object generation method according to an embodiment.

As illustrated in FIG. 1, an image generation apparatus 11 according to the present embodiment has a luminance operating unit 111, moving units 112 and 113, and a composition processing unit 114. In addition, as illustrated in FIG. 2, an object generation apparatus 12 according to the present embodiment has a printing unit 121 and a fabricating unit 122. It should be noted that, in FIGS. 1 and 2, symbols enclosed by a circle or an oval represent information to be input to and output from each unit. The same applies to drawings representing other functional configurations of apparatuses to be described later. In addition, FIG. 3 illustrates parts of images represented by symbols enclosed by a circle or an oval in FIGS. 1 and 2 and, when necessary, figure numbers will be bracketed in the description of respective processes to be provided later. The same applies to FIGS. 4, 8, 11, 13, and 16.

<Image Generation Process>

An image generation process for generating an image that produces the illusory effect described above will now be described. In the following description of the image generation process, for the sake of better understanding, it is assumed that an image is a rectangle on a two-dimensional xy plane and has a contour formed by a straight line with a predetermined length in the x direction and a straight line with a predetermined length in the y direction unless otherwise noted. In addition, it is assumed that a resolution of each image on the xy plane is the same. In other words, it is assumed that the number of pixels in the x direction in each image is the same and that the number of pixels in the y direction in each image is also the same. Furthermore, in the following description of the image generation process, for the sake of better understanding, since the description only pertains to luminance, a value that increases as luminance increases will be referred to as a "pixel value" unless otherwise noted. In other words, a "pixel value" in the description of the present image generation process is equivalent to a pixel value in a monochrome image.

«Preparation of Target Image»

First, as an image to be input to the image generation apparatus 11, an image (a target image $M_T$ in FIG. 3) including an image region (a target $O_T$) for which an illusion as though moving is to be created and a remaining region (a background region $B_T$) is prepared. Pixel values of all pixels in the target $O_T$ according to the present embodiment are the same. The target $O_T$ may have any contour shape and may include a curve in addition to a straight line. For example, the target $O_T$ illustrated in FIG. 4 has a heart shape. The pixel value of each pixel in the background region $B_T$ differs from the pixel value of the target $O_T$.

«Target Image Input Process (Step S110)»

The target image $M_T$ is input to the image generation apparatus 11. The target image $M_T$ input to the image generation apparatus 11 is input to the luminance operating unit 111.

«Luminance Operating Process (Step S111)»

A luminance operation amount L is further input to the luminance operating unit 111. The luminance operation amount L is made up of, for example, a positive number $L_D$ and a positive number $L_L$ and may be input from outside of the image generation apparatus 11 or may be stored in advance and input from a storage unit (not illustrated) in the image generation apparatus 11.

Based on the input target image $M_T$ and the input luminance operation amount $L_D$, the luminance operating unit 111 obtains an image (a dark object image $M_D$) including a region (a dark object $O_D$) of which a shape is the same as that of the target $O_T$ and in which a pixel value of each pixel is smaller than the target $O_T$ by $L_D$ and a remaining region (a background region $B_D$). It is assumed that the pixel value of each pixel in the background region $B_D$ is a pixel value that differs from the dark object $O_D$.

In addition, based on the input target image $M_T$ and the input luminance operation amount $L_L$, the luminance operating unit 111 obtains an image (a light object image $M_L$) including a region (a light object $O_L$) of which a shape is the same as that of the target $O_T$ and in which a pixel value of each pixel is larger than the target $O_T$ by $L_L$ and a remaining region (a background region $B_L$). It is assumed that the pixel value of each pixel in the background region $B_L$ is a pixel value that differs from the light object $O_L$.

It should be noted that the target $O_T$ and the dark object $O_D$ may have slightly different shapes as long as the difference is not perceptually differentiable. The same applies to the target $O_T$ and the light object $O_L$. In other words, the target $O_T$ and the dark object $O_D$ may be approximately the same shape and the target $O_T$ and the light object $O_L$ may be approximately the same shape. α1 and α2 being approximately the same means that α1 and α2 are the same or that α1 and α2 are similar to each other.

Although it has been described above that the luminance operation amount L is made up of, for example, the positive number $L_D$ and the positive number $L_L$, the luminance operation amount L may be defined as a function of the target $O_T$ or may be any amount as long as the amount enables a difference in brightness between the target $O_T$ and the dark object $O_D$ and a difference in brightness between the target $O_T$ and the light object $O_L$ to be perceptually differentiated. However, for example, the luminance operation amount L is preferably set so that a ratio of a difference ($\{L(O_T)-L(O_D)\}/L(O_T)$) between luminance $L(O_T)$ of the target $O_T$ and luminance $L(O_D)$ of the dark object $O_D$ to the luminance $L(O_T)$ of the target $O_T$ is equal to or larger than 0.2 and, similarly, a ratio of a difference ($\{L(O_L)-L(O_T)\}/L(O_L)$) between the luminance $L(O_T)$ of the target $O_T$ and luminance $L(O_L)$ of the light object $O_L$ to the luminance $L(O_T)$ of the target $O_T$ is equal to or larger than 0.2. In addition, $L(O_T)-L(O_D)=L(O_L)-L(O_T)$ may be satisfied or $L(O_T)-L(O_D)\neq L(O_L)-L(O_T)$ may be satisfied. In the example described above, either $L_D=L_L$ or $L_D\neq L_L$ may be satisfied.

«Movement Process (Steps S112 and S113)»

The dark object image $M_D$ obtained by the luminance operating unit 111 is input to the moving unit 112 and the light object image $M_L$ obtained by the luminance operating unit 111 is input to the moving unit 113. A movement amount D is further input to the moving unit 112 and the moving unit 113. The movement amount D is, for example, a vector (Dx, Dy) that represents a movement amount in the xy plane and may be input from outside of the image generation apparatus 11 or may be stored in advance and input from a storage unit (not illustrated) in the image generation apparatus 11. Dx and Dy are positive numbers.

Based on the input dark object image $M_D$ and the input vector (Dx, Dy) representing a movement amount, the moving unit 112 obtains an image (a moved dark object image $M'_D$ (FIG. 3)) which includes a region (a moved dark object $O'_D$) created by moving each pixel of the dark object $O_D$ in the dark object image $M_D$ by (Dx, Dy) and a remaining region (a background region $B'_D$) (step S112). In other words, the moved dark object $O'_D$ is an object which is created by moving a spatial region of the dark object $O_D$ in parallel by the movement amount D while retaining a same shape. A direction of the parallel movement will be referred to as a first direction. A pixel value of each pixel in the background region $B'_D$ is a pixel value that differs from the moved dark object $O'_D$.

Based on the input light object image $M_L$ and the input vector (Dx, Dy) representing a movement amount, the moving unit 113 obtains an image (a moved light object image $M'_L$ (FIG. 3)) which includes a region (a moved light object $O'_L$) created by moving each pixel of the light object $O_L$ in the light object image $M_L$ by (−Dx, −Dy) and a remaining region (a background region $B'_L$) (step S113). In other words, the moved light object $O'_L$ is an object which is created by moving a spatial region of the light object $O_L$ in parallel by the movement amount D in a second direction that is an opposite direction to the first direction while retaining a same shape. A pixel value of each pixel in the background region $B'_L$ is a pixel value that differs from the moved light object $O'_L$.

While a maximum width of a light region $O''_L$ and a maximum width of a dark region $O''_D$ in a composited target image $M_S$ to be described later (FIG. 3) are determined by the movement amount D used by the moving unit 112 and the moving unit 113, each of the maximum widths is desirably a width corresponding to a visual angle of 0.2 degrees or a vicinity thereof. For example, when the composited target image $M_S$ or a final target $O_S$ to be described later is set on the assumption that the composited target image $M_S$ or the final target $O_S$ is to be viewed from a position approximately 100 centimeters away, the maximum width of the light region $O''_L$ and the maximum width of the dark region $O''_D$ are desirably respectively approximately 3.5 millimeters. In consideration thereof, the movement amount D to be input to the moving unit 112 and the moving unit 113 is desirably determined so that the maximum width of the light region $O''_L$ and the maximum width of the dark region $O''_D$ are set to such desirable values. It should be noted that, since the maximum width of the light region $O''_L$ and the maximum width of the dark region $O''_D$ may be adopted so as to create a visual angle equal to or more than 0.2 degrees or equal to or less than 0.2 degrees, the movement amount D to be input to the moving unit 112 and the moving unit 113 is arbitrary. However, as the maximum width of the light region $O''_L$ and the maximum width of the dark region $O''_D$ widen (narrow) relative to a width of a visual perception of 0.2 degrees, a created illusory effect diminishes.

«Composition Process (Step S114)»

Next, the moved dark object image $M'_D$ obtained by the moving unit 112, the moved light object image $M'_L$ obtained by the moving unit 113, and the target image $M_T$ input to the image generation apparatus 11 are input to the composition processing unit 114. Based on the input moved dark object image $M'_D$, the input moved light object image $M'_L$, and the input target image $M_T$, the composition processing unit 114 obtains and outputs a composited target image $M_S$ which is an image including a region (a final target $O_S$) obtained by performing layer composition so that the target $O_T$ is given highest priority while retaining a position of the moved dark object $O'_D$ in the moved dark object image $M'_D$, a position of the moved light object $O'_L$ in the moved light object image $M'_L$, and a position of the target $O_T$ in the target image $M_T$ (in other words, retaining positions of the moved dark object image $M'_D$, the moved light object image $M'_L$, and the target image $M_T$), and a remaining region (the background region $B_S$) (FIG. 3). The composited target image $M_S$ output by the composition processing unit 114 is output from the image generation apparatus 11. It is assumed that the pixel value of each pixel in the background region $B_S$ is a pixel value that differs from the final target $O_S$. It should be noted that, in doing so, layer composition may be performed so that one of the moved dark object $O'_D$ and the moved light object $O'_L$ has a higher priority and the other has a lower priority. For example, the composition processing unit 114 may perform layer composition so that the moved dark object $O'_D$ has a higher priority than the moved light object $O'_L$.

In this case, specifically, on the assumption that the input moved dark object image $M'_D$, the input moved light object image $M'_L$, and the input target image $M_T$ are at a same position in a two-dimensional space, with respect to pixels having the target $O_T$, the composition processing unit 114 adopts a same value as the pixel value of the target $O_T$ as a pixel value of the composited target image $M_S$. In addition, with respect to pixels that do not have the target $O_T$ but have the moved dark object $O'_D$, the composition processing unit 114 adopts a same value as the pixel value of the moved dark object $O'_D$ as a pixel value of the composited target image $M_S$. Furthermore, with respect to pixels that do have neither the target $O_T$ nor the moved dark object $O'_D$ but have the moved light object $O'_L$, the composition processing unit 114 adopts a same value as the pixel value of the moved light object $O'_L$ as a pixel value of the composited target image $M_S$. Moreover, with respect to pixels that do have neither the target $O_T$, nor the moved dark object $O'_D$, nor the moved light object $O'_L$, the composition processing unit 114 adopts a value that differs from any of the pixel value of the target $O_T$, the pixel value of the moved dark object $O'_D$, and the pixel value of the moved light object $O'_L$ as a pixel value of the composited target image $M_S$. It should be noted that, in the composited target image $M_S$, a portion where a same value as the pixel value of the moved dark object $O'_D$ is adopted as a pixel value of the composited target image $M_S$ will be referred to as the dark region $O''_D$. In addition, in the composited target image $M_S$, a portion where a same value as the pixel value of the moved light object $O'_L$ is adopted as a pixel value of the composited target image $M_S$ will be referred to as the light region $O''_L$.

This process is a process called layer composition which gives a layer of the target $O_T$ a highest priority and involves compositing the three layers of the target $O_T$, the moved dark object $O'D_r$ and the moved light object $O'_L$ of the composited target image $M_S$ such that the layer of the moved light object $O'_L$ is arranged bottommost (on a rearmost surface side), the layer of the moved dark object $O'_D$ is superimposed on top of the layer of the moved light object $O'_L$ (on a front surface side of the layer of the moved light object $O'_L$), and the target $O_T$ is superimposed on the top (on a foremost surface side) to obtain the final target $O_S$ that is equivalent to when viewed from a top side (a front surface side) thereof.

The final target $O_S$ obtained by the layer composition can be described as being constituted by the target $O_T$, the dark region $O''_D$, and the light region $O''_L$. In addition, the moved dark object $O'_D$ represents a movement of a spatial position of the dark object $O_D$ and the moved light object $O'_L$ represents a movement of a spatial position of the light object $O_L$. Therefore, the composited target image $M_S$ obtained by the composition can also be described as an image including a region (the final target $O_S$) which is equivalent to an object obtained by an incomplete superposition in which a part of the dark object $O_D$ and a part of the light object $O_L$ are hidden by the target $O_T$.

It should be noted that, in the process of layer composition performed by the composition processing unit 114 described above, when a same pixel has a plurality of objects, a pixel value of an object with a low priority does not affect a pixel value of an obtained image. For example, with respect to pixels that have the target $O_T$, neither the pixel value of the moved dark object $O'_D$ nor the pixel value of the moved light object $O'_L$ affects a pixel value of the final target $O_S$ that is included in the composited target image $M_S$. Accordingly, when the moving unit 112 obtains the moved dark object $O'_D$ in the moved dark object image $M'_D$, an arbitrary pixel value may be set in the moved dark object O'D with respect to pixels with the dark object $O_D$. The same applies to the moving unit 113.

«Object Generation Process (Steps S121 and S122)»

The composited target image $M_S$ obtained by the image generation apparatus 11 is input to the object generation apparatus 12. The object generation apparatus 12 obtains a final target object O from the input composited target image $M_S$ and outputs the final target object O. The composited target image $M_S$ input to the image generation apparatus 12 is input to the object generation apparatus 121. The printing unit 121 obtains a printed object $PM_S$ in which the composited target image $M_S$ has been printed on a flat surface of an object (for example, paper, wood, cloth, glass, synthetic resin, or metal) (step S121). The printed object $PM_S$ obtained by the printing unit 121 is sent to the fabricating unit 122. The fabricating unit 122 cuts out a region where the final target $O_S$ has been printed from the printed object $PM_S$ along a contour line of the final target $O_S$ (cuts out a portion corresponding to the final target $O_S$ from the printed object $PM_S$) and obtains and outputs a final target object O having approximately the same contour as the contour of the final target $O_S$ (step S122, FIG. 3). It should be noted that nothing is present in a background portion α of the final target $O_S$ in FIG. 3 (a portion of the object in which the final target $O_S$ is not present does not exist).

«Illusion Presentation Method»

Figure 5:
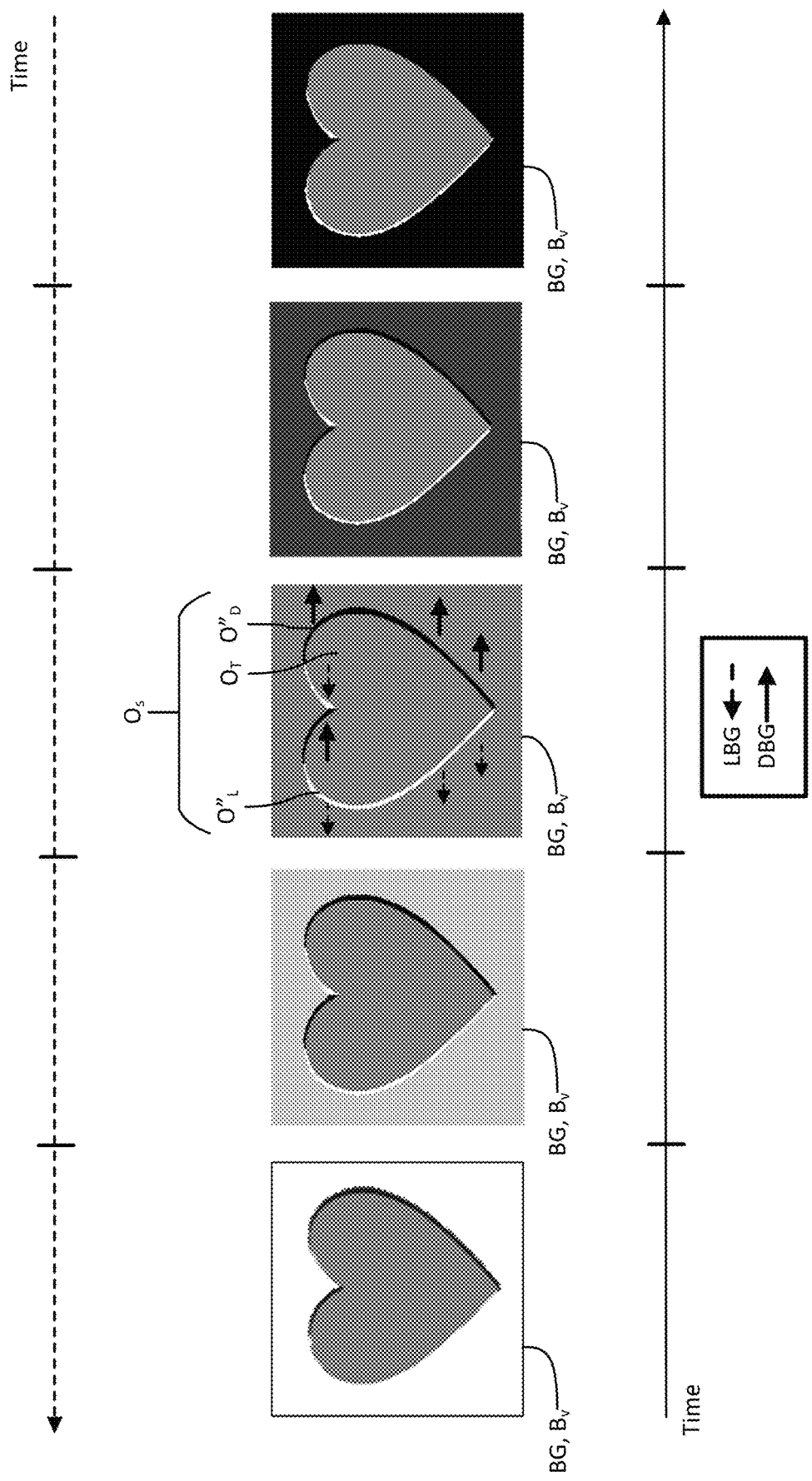
FIG. 5 is a diagram for illustrating an illusory effect produced by a final target and a background of which luminance periodically varies.
Figure 6A:
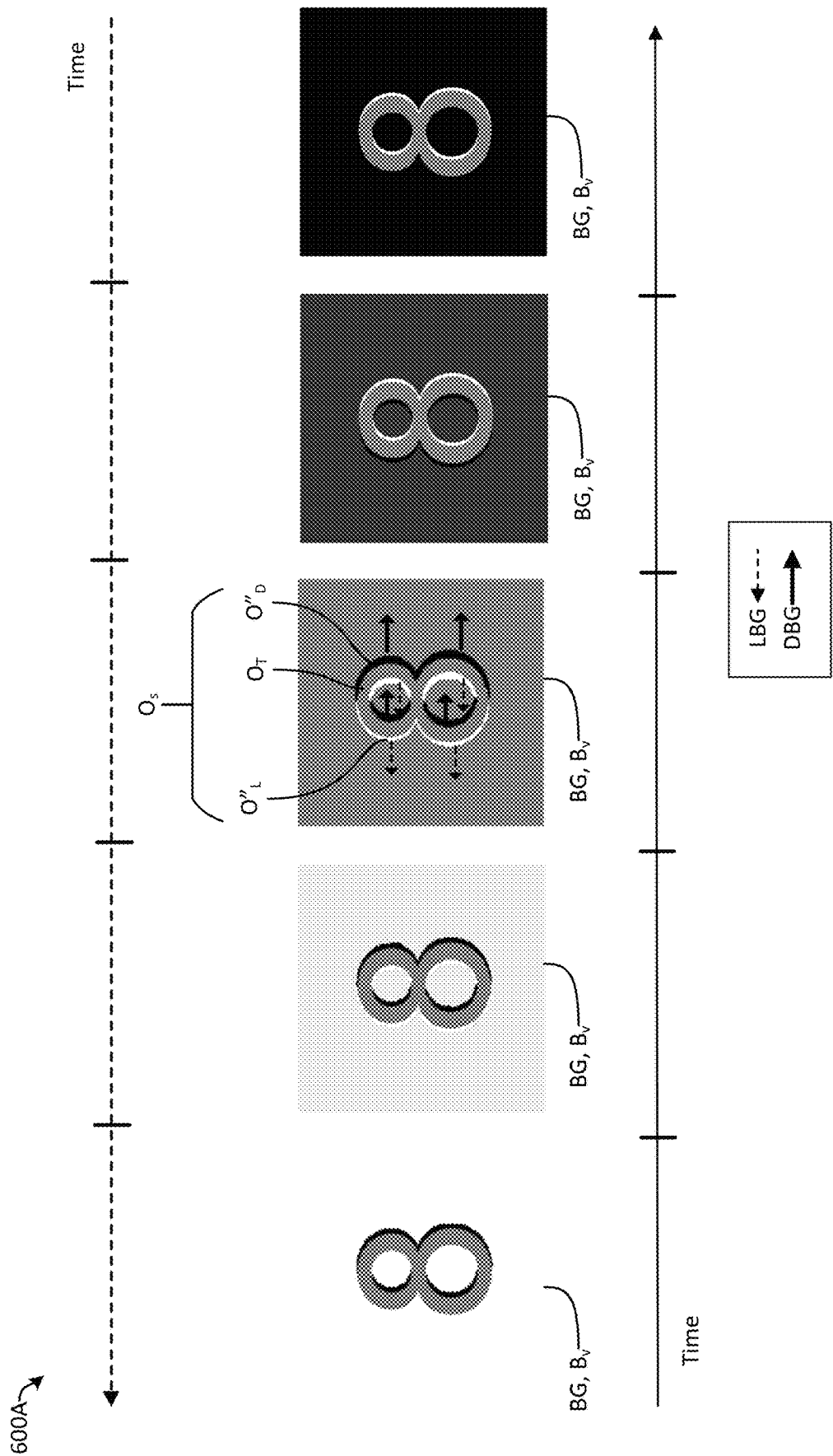
FIGS. 6A and 6B are diagrams for illustrating an illusory effect produced by a final target and a background of which luminance periodically varies.
Figure 6B:
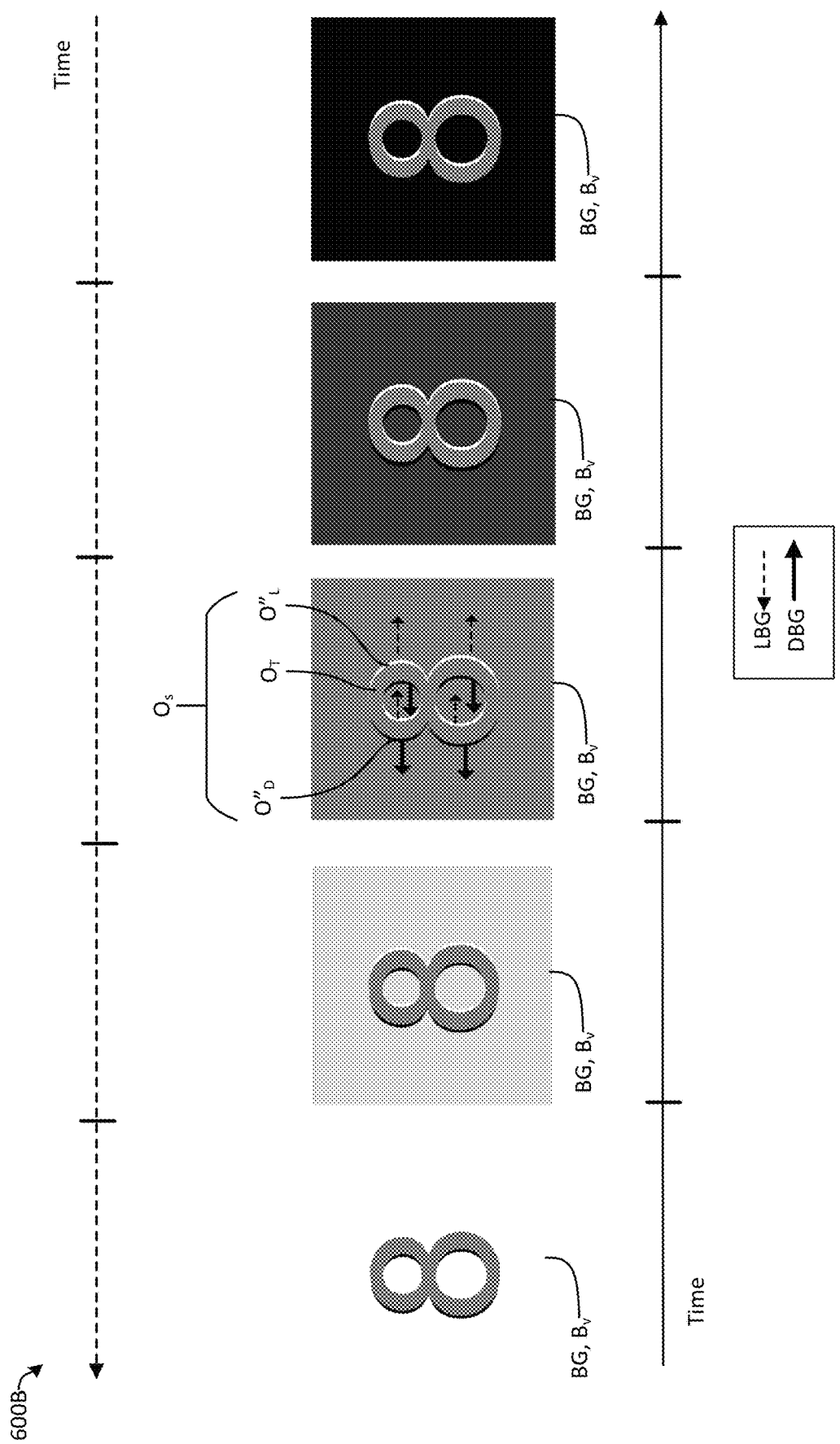

In the present embodiment, the final target object O described above is arranged on a background BG of which luminance varies periodically over time. An observer viewing the final target object O has an illusion that the target $O_T$ printed on the final target object O appears to be moving. Specifically, as illustrated in FIG. 5, the observer viewing a situation where the final target object O is arranged in the background of which overall luminance is the same at each time point and of which luminance periodically varies over time has an illusion that the target $O_T$ of the final target object O appears to be moving in a direction LBG of the light region $O''_L$ when a gradient of a time variation (a gradient of a time variation function) of a luminance value of the background BG is positive (when it becomes lighter), and has an illusion that the target $O_T$ appears to be moving in a direction DBG of the dark region $O''D$ when the gradient of the time variation of the luminance value of the background BG is negative (when it becomes darker). A similar illusory effect can be obtained in a case where the final target object O generated using a figure-eight target $O_T$ as illustrated in FIGS. 6A and 6B is arranged in the background BG of which luminance periodically varies in place of the heart-shaped target $O_T$ illustrated in FIG. 5. It should be noted that, in FIGS. 5, 6A, and 6B, the direction DBG is the first direction in the movement process described earlier and the direction LBG is the second direction in the movement process described earlier.

The periodical time variation of the luminance of the background BG is set to 0.25 Hz or higher and 3 Hz or lower. In addition, an average value of the luminance of the background BG which varies over time is preferably a luminance value of the target $O_T$ printed on the final target object O or a value in a vicinity of the luminance value of the target $O_T$. In this case, a condition requiring that the average value of the luminance of the background BG which varies over time be the luminance value of the target $O_T$ or a value in the vicinity of the luminance value of the target $O_T$ will be referred to as an "optimal luminance condition". A minimum luminance value in the time variation of the luminance of the background BG is preferably a luminance value of the dark region $O''_D$ or a value in a vicinity of the luminance value of the dark region $O''_D$. In addition, a maximum luminance value in the time variation of the luminance of the background BG is preferably a luminance value of the light region $O''_L$ or a value in a vicinity of the luminance value of the light region $O''_L$. However, the minimum luminance value and the maximum luminance value of the luminance of the background BG which varies over time may be values other than the above. As the background BG, for example, a liquid crystal screen of a tablet terminal or the like, electronic paper capable of displaying a temporally smooth luminance variation, a display apparatus, or a sign or a billboard obtained by covering a light source of which luminance continuously varies with a translucent plate or the like can be used. The final target object O may be traded as an illusion apparatus or a set of an illusion apparatus and an apparatus that presents a background may be traded as an illusion apparatus.

Feature of Present Embodiment

In the present embodiment, the image generation apparatus 11 obtains an image including a dark object $O_D$ of which luminance is lower than a target $O_T$ and a light object $O_L$ of which luminance is higher than the target $O_T$. In addition, the image generation apparatus 11 obtains an image including a moved dark object $O'_D$ obtained by moving the dark object $O_D$ in parallel in a certain direction (a first direction) and an image including a moved light object $O'_L$ obtained by moving the light object $O_L$ in parallel in a second direction that is an opposite direction to the first direction. Furthermore, the image generation apparatus 11 performs layer composition so that the target $O_T$ is given a highest priority while retaining a positional relationship of the target $O_T$, the moved dark object $O'_D$, and the moved light object $O'_L$ and obtains a composited target image $M_S$ including a final target $O_S$. Moreover, the object generation apparatus 12 generates a printed object $PM_S$ of the composited target image $M_S$, and cuts out a portion corresponding to the final target $O_S$ from the printed object $PM_S$ to obtain a final target object O. The final target object O is arranged on a background BG (a background object) of which luminance varies periodically over time. An observer viewing the situation has an illusion that the target $O_T$ which should not be moving appears to move in parallel on a background BG. As described above, in the present embodiment, in addition to a rectangular target such as that described in NPL1, an illusion that a target $O_T$ which should not be moving appears to move can be created regardless of how complex a contour shape of the target $O_T$ is.

First Modification of First Embodiment

The final target object O may be generated without using the object generation apparatus 12. Specifically, in the first embodiment, the object generation apparatus 12 prints the composited target image $M_S$ obtained by the image generation apparatus 11 on an object to obtain the printed object $PM_S$, and cuts out the final target object O from the printed object $PM_S$. Alternatively, a user may print the composited target image $M_S$ obtained by the image generation apparatus 11 on an object by inputting the composited target image $M_S$ to a known printer or the like to obtain the printed object $PM_S$ or the user may copy the printed object $PM_S$ using a copier to obtain a separate printed object $PM_S$, and the user may cut out the final target object O from the printed object $PM_S$ using a pair of scissors or the like. In other words, the image generation apparatus 11 may be operated on a stand-alone basis without providing the object generation apparatus 12.

Second Modification of First Embodiment

In the first embodiment, the final target object O is obtained from the composited target image $M_S$ and the final target object O is arranged in the background BG. However, an image (a presentation image MO may be obtained by performing layer composition of a layer of a final target $O_S$ which is equivalent to an "object" obtained by a superposition of the three objects of the target $O_T$, the dark object $O_D$, and the light object $O_L$ having approximately the same shape among the composited target image $M_S$ and a layer of an image of a background of which luminance periodically varies over time so that the layer of the final target $O_S$ is given higher priority. An observer viewing such a presentation image $M_B$ also has an illusion that the target $O_T$ which should not be moving appears to move. Although, generally, there are cases where a still image made of a single frame image is referred to as an "image" and a moving image made up of a plurality of frame images is referred to as a "video" and there are cases where a still image and a moving image are both referred to as an "image", in the present specification, a still image and a moving image will be both referred to as an "image". The following description will focus on differences from matters heretofore described, and matters already described will be denoted using same reference numerals and descriptions thereof will be simplified.

<Configuration>

As illustrated in FIG. 1, an image generation apparatus 11' according to the present modification has the luminance operating unit 111, the moving units 112 and 113, the composition processing unit 114, and a background compositing unit 115.

<Image Generation Process>

Figure 4:
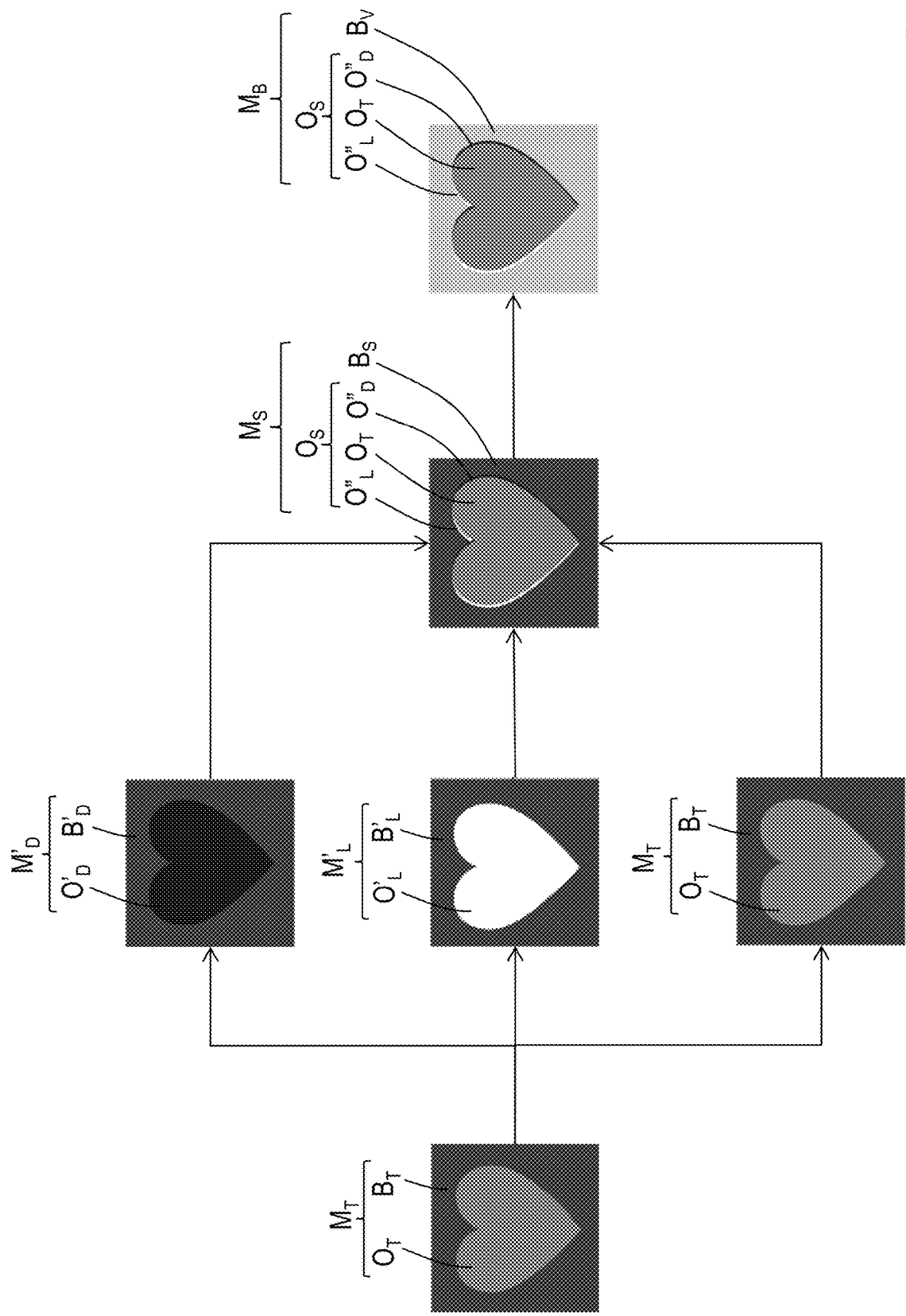
FIG. 4 is a diagram illustrating a part of an input/output image of each process in an image generation method according to an embodiment.

In an image generation process according to the present modification, a composited target image $M_S$ obtained by the composition process by the composition processing unit 114 is input to the background compositing unit 115. The background compositing unit 115 performs layer composition of a layer of a final target $O_S$ included in the composited target image $M_S$ and a layer of an image $B_V$ of a background of which luminance periodically varies over time so that the layer of the final target $O_S$ is given higher priority, and obtains and outputs the presentation image $M_B$ (FIG. 4). Examples are also shown in FIGS. 5, 6A, 6B, 9A, 9B, 14A and 14B. For example, the background compositing unit 115 generates the image $B_V$ of the background of which luminance periodically varies over time, obtains the presentation image $M_B$ by replacing a pixel value of each pixel in a region with a same shape as the final target $O_S$ on a two-dimensional plane of the generated image $B_V$ by a pixel value of each corresponding pixel in the final target $O_S$ included in the composited target image $M_S$, and outputs the presentation image $M_B$. The presentation image $M_B$ can also be described as an image in which the luminance of the background region $B_D$ is periodically varied over time while maintaining the luminance of the final target $O_S$ of the composited target image $M_S$. It should be noted that a presentation image $M_B$ which is larger than the composited target image $M_S$ may be obtained, in which case an image $B_V$ of a background with a same size of a desired presentation image $M_B$ may be generated. The time variation of the luminance of the image By of the background must be set to 0.25 Hz or higher and 3 Hz or lower and the "optimal luminance condition" described earlier is preferably satisfied. In other words, the background compositing unit 115 may generate, based on the input composited target image $M_S$, the image By of the background in which an average value of a time variation of luminance is a luminance value of the target $O_T$ included in the composited target image $M_S$ or a value in a vicinity of the luminance value of the target $O_T$. The presentation image $M_B$ obtained by the background compositing unit 115 is output from the image generation apparatus 11'. The presentation image $M_B$ output from the image generation apparatus 11' may be input to a known display apparatus or a projector, and the presentation image $M_B$ may be displayed on a display, projected on a screen or the like by the projector, or the like. In addition, when the image generation apparatus 11' includes a display unit such as a display (not illustrated), instead of outputting the presentation image $M_B$ from the image generation apparatus 11' to the outside of the image generation apparatus 11', the background compositing unit 115 may input the presentation image $M_B$ to the display unit and the display unit may be caused to display the presentation image $M_B$. Accordingly, an illusory effect as described above may be exerted to an observer viewing the presentation image $M_B$. An illusion apparatus that presents the presentation image $M_B$ may be traded.

Third Modification of First Embodiment

In the first embodiment and the first and second modifications thereof, pixel values of all pixels are the same in each of the target $O_T$, the dark region $O''_D$, and the light region $O''_L$. In other words, luminance is uniform in each of the target $O_T$, the dark region $O''_D$, and the light region $O''_L$. However, luminance need not be uniform in each of the target $O_T$, the dark region $O''_D$, and the light region $O''_L$. In addition, although colors the target $O_T$, the dark region $O''_D$, and the light region $O''_L$ have not been mentioned in the first embodiment and the first and second modifications thereof, color may be uniform or may not be uniform in each of the target $O_T$, the dark region $O''_D$, and the light region $O''_L$. However, in order to produce a clearer illusory effect, the luminance and the color of the target $O_T$ are desirably uniform. On the other hand, even when the luminance and/or the color of the dark region $O''_D$ and/or the light region $O''_L$ are not uniform and the dark region $O''_D$ and/or the light region $O''_L$ have gradation or patterns, an impact on an illusory effect is small. Furthermore, while a luminance of a background (the background BG or the image $B_V$ of the background) is spatially uniform in the first embodiment and the first and second modifications thereof, the luminance of the background need not be spatially uniform as long as a time variation of the luminance of the background satisfies the "optimal luminance condition" described earlier. Moreover, the background (the background BG or the image $B_V$ of the background) may include a color component or may not include a color component, and the included color component may be spatially uniform or may not be spatially uniform.

Second Embodiment

Figure 8:
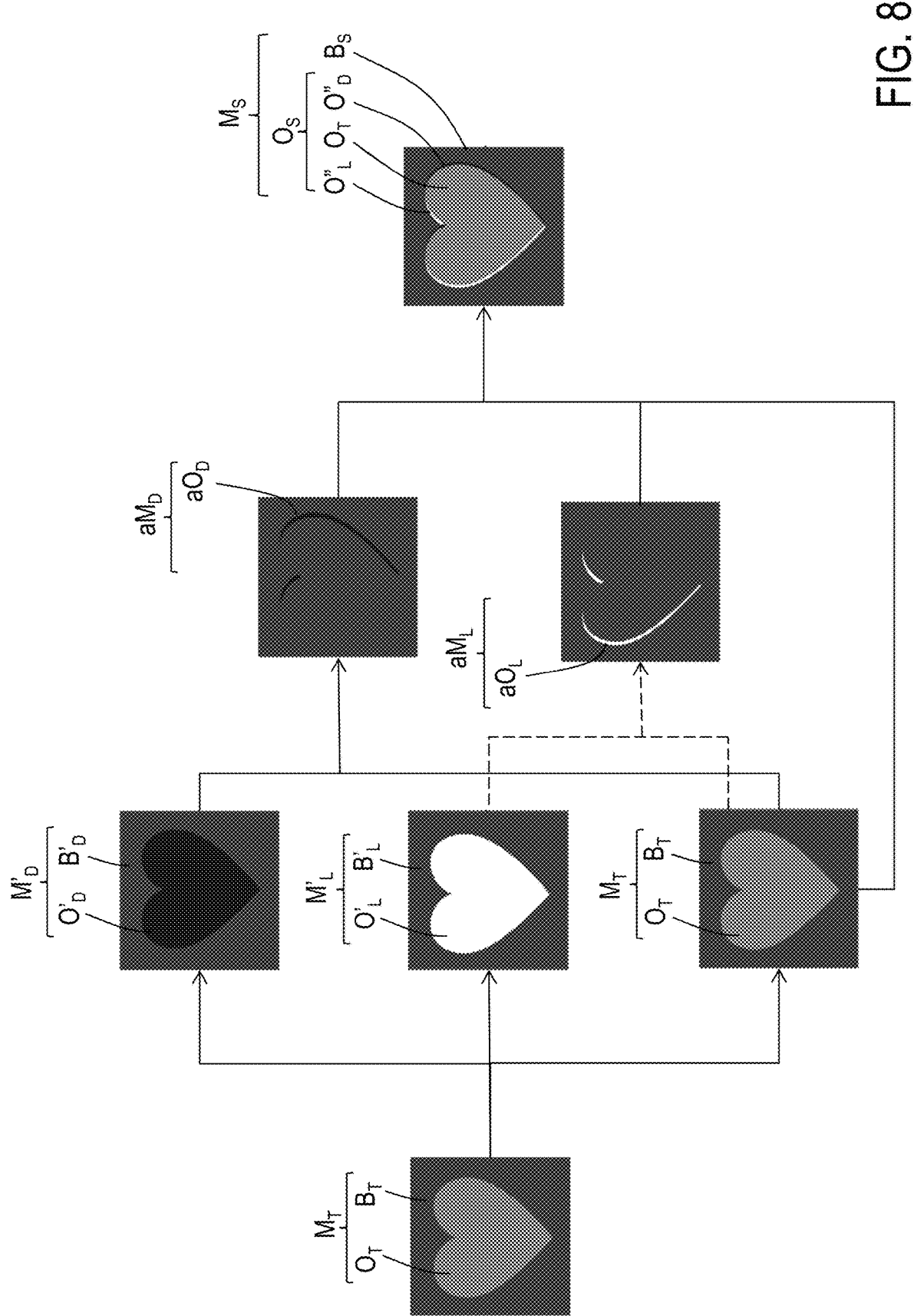
FIG. 8 is a diagram illustrating a part of an input/output image of each process in an image generation method according to an embodiment.

In the first embodiment and the first to third modifications thereof, the composited target image $M_S$ including the final target $O_S$ is obtained by performing layer composition of the moved dark object $O'_D$ of the moved dark object image $M'_D$, the moved light object $O'_L$ of the moved light object image $M'_L$, and the target $O_T$ of the target image $M_T$ while retaining positions of the moved dark object image $M'D_D$, the moved light object image $M'_L$, and the target image $M_T$ (FIGS. 3 and 4). Alternatively, an image (an additional dark region image $aM''_D$) which includes the dark region $O''_D$ and an image (an additional light region image $aM''_L$) which includes the light region $O''_L$ may be obtained using the moved dark object image $M'_D$, the moved light object image $M'_L$, and the target image $M_T$, and the additional dark region image $M''_D$, the additional light region image $M''_L$, and the target image $M_T$ may be composited to obtain the composited target image $M_S$ (FIG. 8). This embodiment will be described below.

<Configuration>

Figure 7:
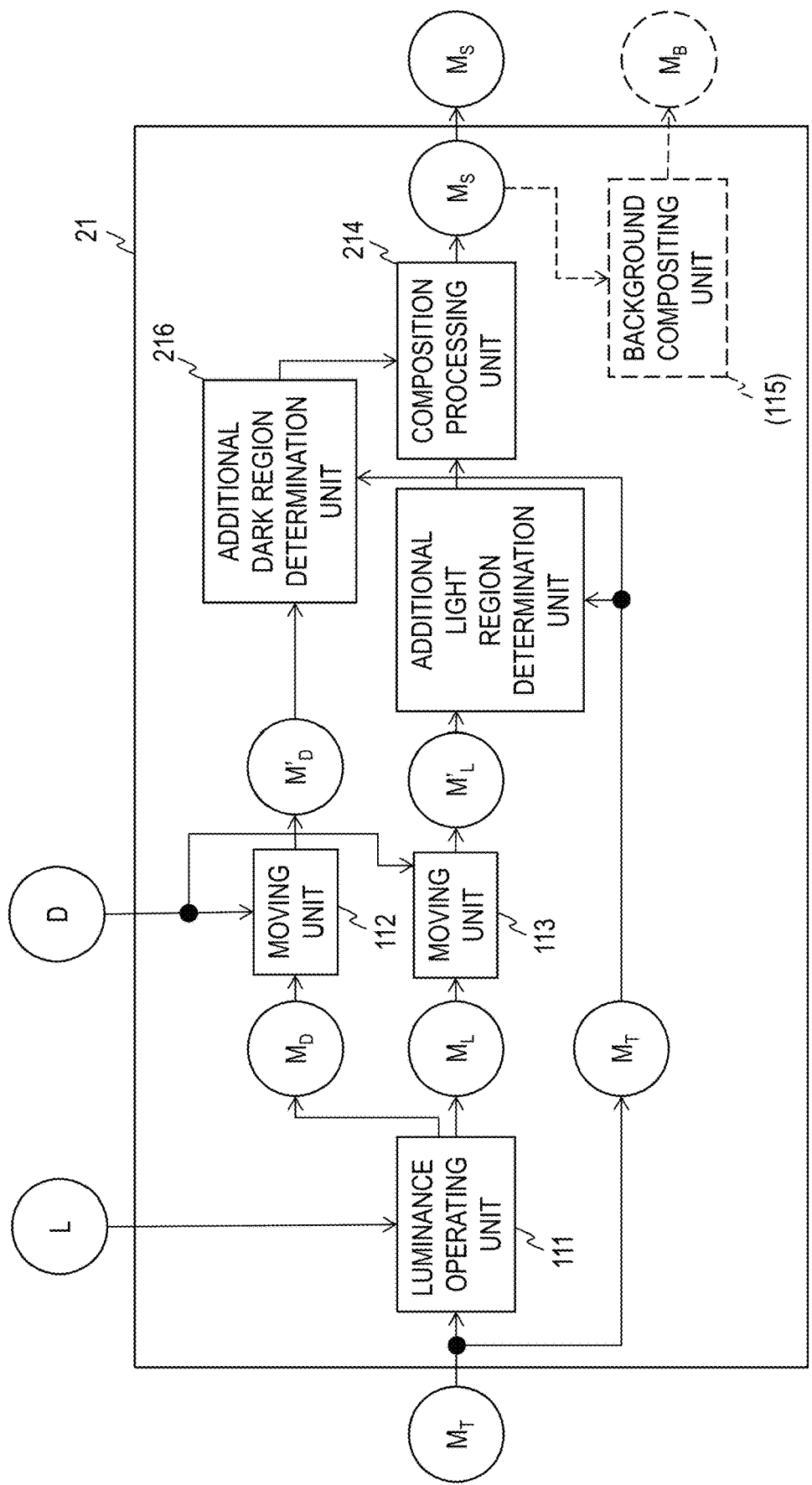
FIG. 7 is a block diagram illustrating a functional configuration of an image generation apparatus according to an embodiment.

As illustrated in FIG. 7, an image generation apparatus 21 according to the present embodiment has the luminance operating unit 111, the moving units 112 and 113, an additional dark region determination unit 216, an additional light region determination unit 217, and the composition processing unit 114. A target image $M_T$ is input to the image generation apparatus 21 according to the present embodiment in a similar manner to the image generation apparatus 11 according to the first embodiment. In addition, the image generation apparatus 21 according to the present embodiment obtains and outputs a composited target image $M_S$ in a similar manner to the image generation apparatus 11.

<Image Generation Process>

An image generation process according to the present embodiment will be described.

First, in place of the image generation apparatus 11, the image generation apparatus 21 executes the processes of steps S110 to S113 described in the first embodiment. The target image $M_T$ input to the image generation apparatus 11 and the moved dark object image $M'_D$ obtained by the moving unit 112 in step S112 are input to the additional dark region determination unit 216. The target image $M_T$ input to the image generation apparatus 11 and the moved light object image $M'_L$ obtained by the moving unit 113 in step S113 are input to the additional light region determination unit 217.

«Additional Dark Region Determination Process (Step S216)»

Using the moved dark object image $M'_D$ and the target image $M_T$, the additional dark region determination unit 216 obtains an additional dark region $aO_D$ in which a pixel value of pixels included in the moved dark object $O'_D$ but not included in the target $O_T$ is changed to a same pixel value as the moved dark object $O'_D$ and outputs an image (an additional dark region image $aM_D$) which only includes the additional dark region $aO_D$.

«Additional Light Region Determination Process (Step S217)»

Using the moved light object image $M'_L$ and the target image $M_T$, the additional light region determination unit 217 obtains an additional light region $aO_L$ in which a pixel value of pixels included in the moved light object $O'_L$ but not included in the target $O_T$ is changed to a same pixel value as the moved light object $O'_L$ and outputs an image (an additional light region image $aM_L$) which only includes the additional light region $aO_L$.

«Composition Process (Step S214)»

The additional dark region image $aM_D$ obtained by the additional dark region determination unit 216, the additional light region image $aM_L$ obtained by the additional light region determination unit 217, and the target image $M_T$ input to the image generation apparatus 21 are input to the composition processing unit 214. The composition processing unit 214 obtains and outputs a composited target image $M_S$ by compositing the additional dark region image $aM_D$, the additional light region image $aM_L$, and the target image $M_T$. For example, the following two composition methods are available.

In a first method, the composition processing unit 214 obtains and outputs, as the composited target image $M_S$, an image in which a pixel value of a pixel corresponding to each pixel of the additional dark region $aO_D$ in the additional dark region image $aM_D$ among pixels of the target image $M_T$ is changed to a same pixel value as the additional dark region $aO_D$ and in which a pixel value of a pixel corresponding to each pixel of the additional light region $aO_L$ in the additional light region image $aM_L$ among pixels of the target image $M_T$ is changed to a same pixel value as the additional light region $aO_L$ (FIG. 8). In this method, in the composited target image $M_S$, a region adopting the pixel value of the additional dark region $aO_D$ is to be a dark region $O''_D$, a region adopting the pixel value of the additional light region $aO_L$ is to be a light region $O''_L$, and a region constituted by the target $O_T$, the dark region $O''_D$, and the light region $O''_L$ is to be a final target $O_S$. In addition, a region other than the final target $O_S$ is to be a background region $B_S$.

In a second method, first, the composition processing unit 214 adopts a specific pixel value that differs from any of the pixel value of the additional dark region $aO_D$, the pixel value of the additional light region $aO_L$, and the pixel value of the target $O_T$ as a pixel value A. Next, the composition processing unit 214 obtains an image $aM_D'$ in which, among an image region with a same rectangular shape as the target image $M_T$ on a two-dimensional xy plane, a pixel value of a pixel corresponding to each pixel of the additional dark region $aO_D$ in the additional dark region image $aM_D$ is set to a same pixel value as the additional dark region $aO_D$ and a pixel value of a pixel not corresponding to a pixel of the additional dark region $aO_D$ in the additional dark region image $aM_D$ is set to the pixel value A. In addition, the composition processing unit 214 obtains an image $aM_L'$ in which, among an image region with a same rectangular shape as the target image $M_T$ on a two-dimensional xy plane, a pixel value of a pixel corresponding to each pixel of the additional light region $aO_L$ in the additional light region image $aM_L$ is set to a same pixel value as the additional light region $aO_L$ and a pixel value of a pixel not corresponding to a pixel of the additional light region $aO_L$ in the additional light region image $aM_L$ is set to the pixel value A. Furthermore, the composition processing unit 214 obtains an image $M_T'$ in which a pixel value of the background region $B_T$ in the target image $M_T$ is set to the pixel value A. Moreover, the composition processing unit 214 obtains a pixel value of each pixel in the composited target image $M_S$ as described below.

With respect to a pixel of which a value of a sum of a pixel value of the image $aM_D'$, a pixel value of the image $aM_L'$, and a pixel value of the image $M_T'$ is equal to three times the pixel value A, the composition processing unit 214 sets a pixel value of the pixel in the composited target image $M_S$ to the pixel value A. In addition, among pixels of which a value of a sum of a pixel value of the image $aM_D'$, a pixel value of the image $aM_L'$, and a pixel value of the image $M_T'$ is not equal to three times the pixel value A, with respect to a pixel of which a value obtained by subtracting twice the pixel value A from the value of the sum is equal to the pixel value of the target image $M_T$, the composition processing unit 214 sets a pixel value of the pixel in the composited target image $M_S$ to a same pixel value as the target image $M_T$. Furthermore, among pixels of which a value of a sum of a pixel value of the image $aM_D'$, a pixel value of the image $aM_L'$, and a pixel value of the image $M_T'$ is not equal to three times the pixel value A, with respect to a pixel of which a value obtained by subtracting twice the pixel value A from the value of the sum is equal to the pixel value of the additional light region $aO_L$, the composition processing unit 214 sets a pixel value of the pixel in the composited target image $M_S$ to a same pixel value as the additional light region $aO_L$. Moreover, among pixels of which a value of a sum of a pixel value of the image $aM_D'$, a pixel value of the image $aM_L'$, and a pixel value of the image $M_T'$ is not equal to three times the pixel value A, with respect to a pixel of which a value obtained by subtracting twice the pixel value A from the value of the sum is neither the pixel value of the target image $M_T$ nor the pixel value of the additional light region $aO_L$, the composition processing unit 214 sets a pixel value of the pixel in the composited target image $M_S$ to a same pixel value as the additional dark region $aO_D$. After performing these processes, the composition processing unit 214 outputs the composited target image $M_S$. In this method, in the composited target image $M_S$, a region where the pixel value is set to a same pixel value as the target image $M_T$ is to be a target $O_T$, a region where the pixel value is set to a same pixel value as the additional light region $aO_L$ is to be a light region $O''_L$, a region where the pixel value is set to a same pixel value as the additional dark region $aO_D$ is to be a dark region $O''_D$, and a region constituted by the target $O_T$, the dark region $O''_D$, and the light region $O''_L$ is to be a final target $O_S$. In addition, a region where the pixel value is set to A is to be the background region $B_S$.

Subsequently, the object generation apparatus 12 described in the first embodiment performs the object generation process (steps S121 and S122) to obtain a final target object O. Using the target O enables a similar perception to the first embodiment to be given to an observer with the illusion presentation method according to the first embodiment.

Third Embodiment

The first and second embodiment and the modifications thereof are related to a technique for giving an illusion that a target $O_T$ arranged on a background BG of which luminance periodically varies over time or a target $O_T$ composited with an image $B_V$ of a background of which luminance periodically varies over time appears to move in parallel. On the other hand, in addition to an illusion involving a parallel movement of the target $O_T$, the present technique can create an illusion (a rotation illusion) in which the target $O_T$ appears to be performing a rotational movement. By performing a rotational movement in place of the parallel movement of the dark object $O_D$ and the light object $O_L$ which is performed by the moving units 112 and 113 described in the first embodiment, regardless of a contour of the target $O_T$, an illusion that the target $O_T$ appears to be performing a rotational movement can be given despite not actually performing a rotational movement.

An apparatus configuration of an image generation apparatus 11'' according to the present embodiment is the same as the apparatus configuration of the image generation apparatus 11 according to the first embodiment and, as illustrated in FIG. 1, the image generation apparatus 11'' has the luminance operating unit 111, the moving units 112 and 113, and the composition processing unit 114. The image generation apparatus 11'' according to the present embodiment obtains and outputs a composited target image $M_S$ in a similar manner to the image generation apparatus 11 according to the first embodiment. The image generation apparatus 11'' according to the present embodiment only differs from the image generation apparatus 11 according to the first embodiment in a movement process performed by the moving unit 112 and the moving unit 113, and other processes or, in other words, the luminance operation process (step S111) performed by the luminance operating unit 111 and the composition process (step S114) performed by the composition processing unit 114 are the same as in the first embodiment. Hereinafter, the movement process performed by the moving unit 112 and the moving unit 113 of the image generation apparatus 11'' according to the present embodiment will be described.

The moving unit 112 and the moving unit 113 according to the present embodiment perform a movement process (steps S112' and S113') in place of the movement process (steps S112 and S113) described earlier.

«Movement process (steps S112' and S113')» The dark object image $M_D$ obtained by the luminance operating unit 111 is input to the moving unit 112 and the light object image $M_L$ obtained by the luminance operating unit 111 is input to the moving unit 113. A rotation angle D' is further input to the moving unit 112 and the moving unit 113. The rotation angle D' may be input from outside of the image generation apparatus 11 or may be stored in advance and input from a storage unit (not illustrated) in the image generation apparatus 11.

Based on the input dark object image $M_D$ and the input rotation angle D', the moving unit 112 obtains an image (a moved dark object image $M'_D$) which includes a moved dark object $O'_D$ created by rotating the dark object $O_D$ in the dark object image $M_D$ around a certain center point in a certain rotation direction (a first rotation direction) by the rotation angle D' and a remaining region (a background region $B'_D$). In other words, the moved dark object $O'_D$ is an object which is created by causing a spatial region of the dark object $O_D$ to rotationally move in the first rotation direction by the rotation angle D' while retaining a same shape. A pixel value of each pixel in the background region $B'_D$ is a pixel value that differs from the moved dark object $O'_D$.

Based on the input light object image $M_L$ and the input rotation angle D', the moving unit 113 obtains an image (a moved light object image $M'_L$) which includes a moved light object $O'_L$ created by rotating the light object $O_L$ in the light object image $M_L$ around a certain center point in a second rotation direction that is an opposite rotation direction to the first rotation direction by the rotation angle D' and a remaining region (a background region $B'_L$). In other words, the moved light object $O'_L$ is an object which is created by causing a spatial region of the light object $O_L$ to rotationally move in the second rotation direction that is an opposite rotation direction to the first rotation direction by the rotation angle D' while retaining a same shape. A pixel value of each pixel in the background region $B'_L$ is a pixel value that differs from the moved light object $O'_L$.

After obtaining the composited target image $M_S$, the present embodiment is the same as the first embodiment or the first and second modifications thereof. Alternatively, the additional dark region determination unit 216, the additional light region determination unit 217, and the composition processing unit 214 may be provided in place of the composition processing unit 114, and the composited target image $M_S$ may be obtained by performing the additional dark region determination process and the composition process according to the second embodiment using the moved dark object image $M'_D$ obtained by the moving unit 112, the moved light object image $M'_L$ obtained by the moving unit 113, and the target image $M_T$. In addition, luminance and colors of the target $O_T$, the dark region $O''_D$, the light region $O''_L$, the background BG, and the image $B_V$ are the same as the third modification of the first embodiment.

Figure 9B:
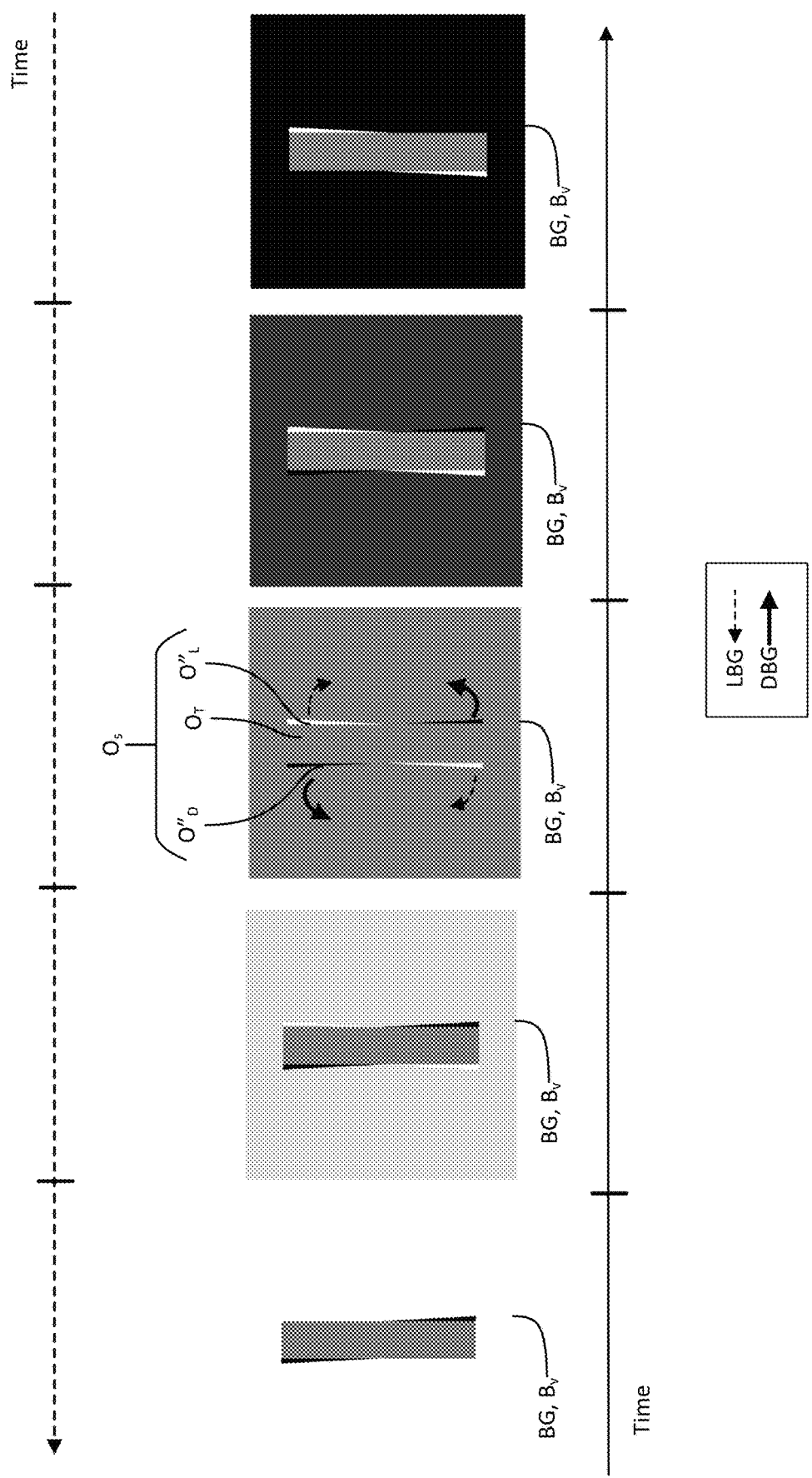

Accordingly, an illusion can be created in which the target $O_T$ appears to be performing a rotational movement. For example, let us assume that, as illustrated in FIGS. 9A and 9B, the observer views a situation where the final target object O according to the present embodiment is arranged in a background BG of which overall luminance is the same at each time point and of which luminance periodically varies over time. At this point, the observer has an illusion that the target $O_T$ of the final target object O is rotationally moving in a direction LBG of the light region $O''_L$ when a gradient of a time variation of a luminance value of the background BG is positive and has an illusion that the target $O_T$ appears to be moving in a direction DBG of the dark region $O''_D$ when the gradient of the time variation of the luminance value of the background BG is negative. As a result, when the gradient of the time variation of the luminance value of the background BG is positive, the target $O_T$ in FIG. 9A appears to be rotating counterclockwise and the target $O_T$ in FIG. 9B appears to be rotating clockwise. On the other hand, when the gradient of the time variation of the luminance value of the background BG is negative, the target $O_T$ in FIG. 9A appears to be rotating clockwise and the target $O_T$ in FIG. 9B appears to be rotating counterclockwise. It should be noted that, in FIGS. 9A and 9B, the direction DBG is the first rotation direction in the movement process described earlier and the direction LBG is the second rotation direction in the movement process described earlier.

When creating such a rotation illusion, each of a maximum width of the dark region $O''_D$ and a maximum width of the light region $O''_L$ in the composited target image $M_S$ is desirably a width corresponding to a visual angle of 0.2 degrees or a vicinity thereof. For example, when the composited target image $M_S$ or the final target $O_S$ is set on the assumption that the composited target image $M_S$ or the final target $O_S$ is to be viewed from a position approximately 100 centimeters away, a maximum value of a deviation amount between the target $O_T$ and the light region $O''_L$ and the maximum value of a deviation amount between the target $O_T$ and the dark region $O''_D$ are desirably respectively approximately 3.5 millimeters. In consideration thereof, the rotation angle D' to be input to the moving unit 112 and the moving unit 113 is desirably determined so that the maximum width of the dark region $O''_D$ and the maximum width of the light region $O''_L$ are set to such desirable values. It should be noted that, although a created illusory effect is small, since the maximum width of the dark region $O''_D$ and the maximum width of the light region $O''_L$ may be equal to or larger than or equal to or smaller than such desirable values, the rotation angle D' to be input to the moving unit 112 and the moving unit 113 is arbitrary.

Fourth Embodiment

In the present embodiment, a method of causing an illusion (enlargement/reduction illusion) that a target appears to be enlarged or reduced on a background of which luminance periodically varies will be described. Since the present embodiment includes a case where the target and a dark object are used and a case where the target and a light object are used, each case will be described.

Figure 10:
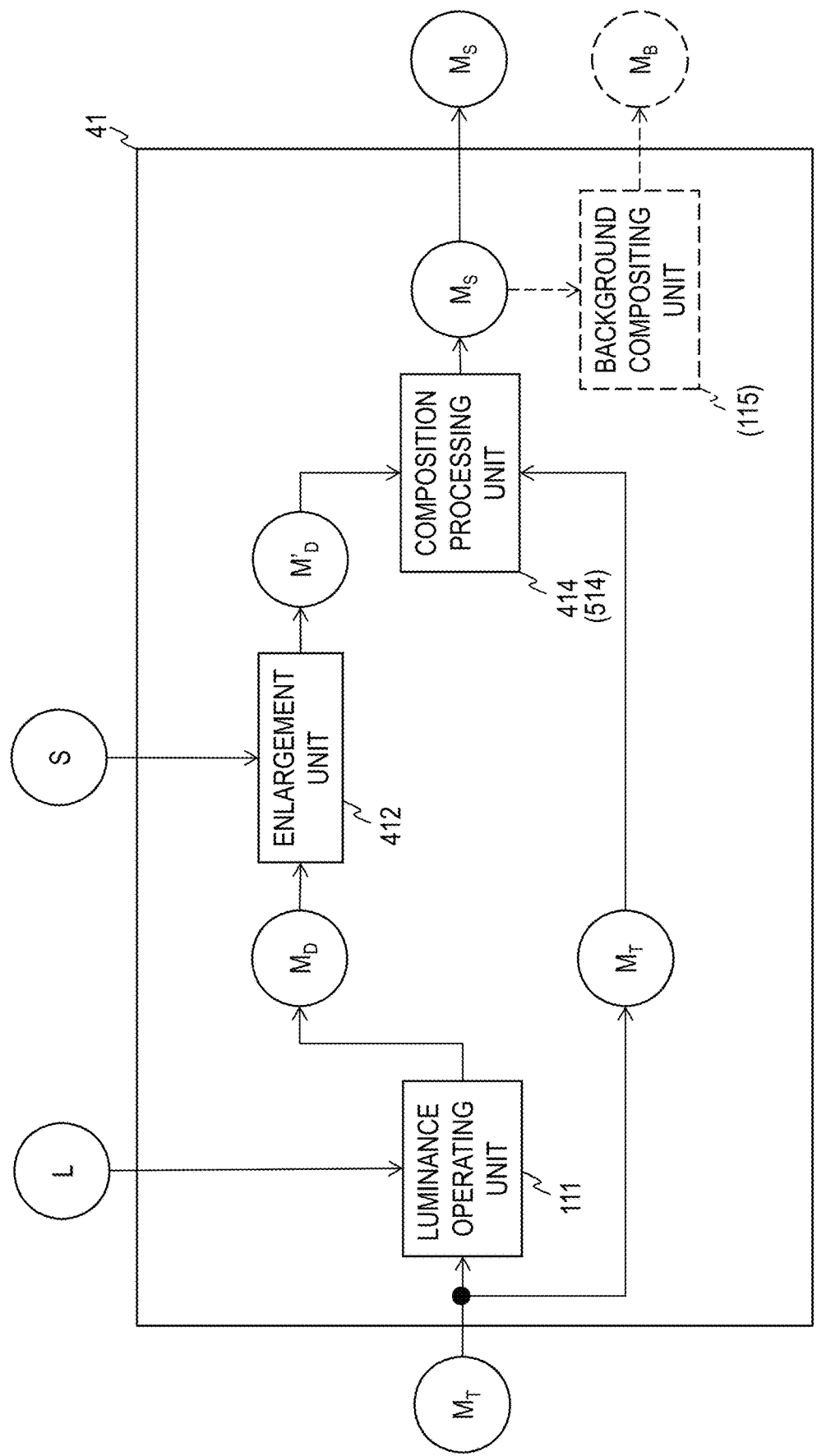
FIG. 10 is a block diagram illustrating a functional configuration of an image generation apparatus according to an embodiment.

<Case of Using Target and Dark Object>
First, a case where a target and a dark object are used will be described.
<Configuration>
As illustrated in FIG. 10, an image generation apparatus 41 in this case has the luminance operating unit 111, an enlargement unit 412, and a composition processing unit 414.
<Image Generation Process>
In an image generation process in this case, the image generation apparatus 41 executes the process of step S110 and the process of obtaining a dark object image $M_D$ among step S111 described in the first embodiment. In addition, the dark object image $M_D$ obtained in the process of S111 is input to the enlargement unit 412.
«Enlargement Process (Step S412)»
The dark object image $M_D$ obtained by the luminance operating unit 111 in the process of step S111 and information S representing an enlargement factor are input to the enlargement unit 412. The information S representing an enlargement factor may be input from outside of the image generation apparatus 41 or may be stored in advance and input from a storage unit (not illustrated) in the image generation apparatus 41. When the enlargement unit 412 uses affine transformation, (Mx, My) which is a set of an enlargement factor Mx (Mx>1) in a horizontal direction and an enlargement factor My (My>1) in a vertical direction is input to the enlargement unit 412 as the information S representing an enlargement factor.

Figure 11:
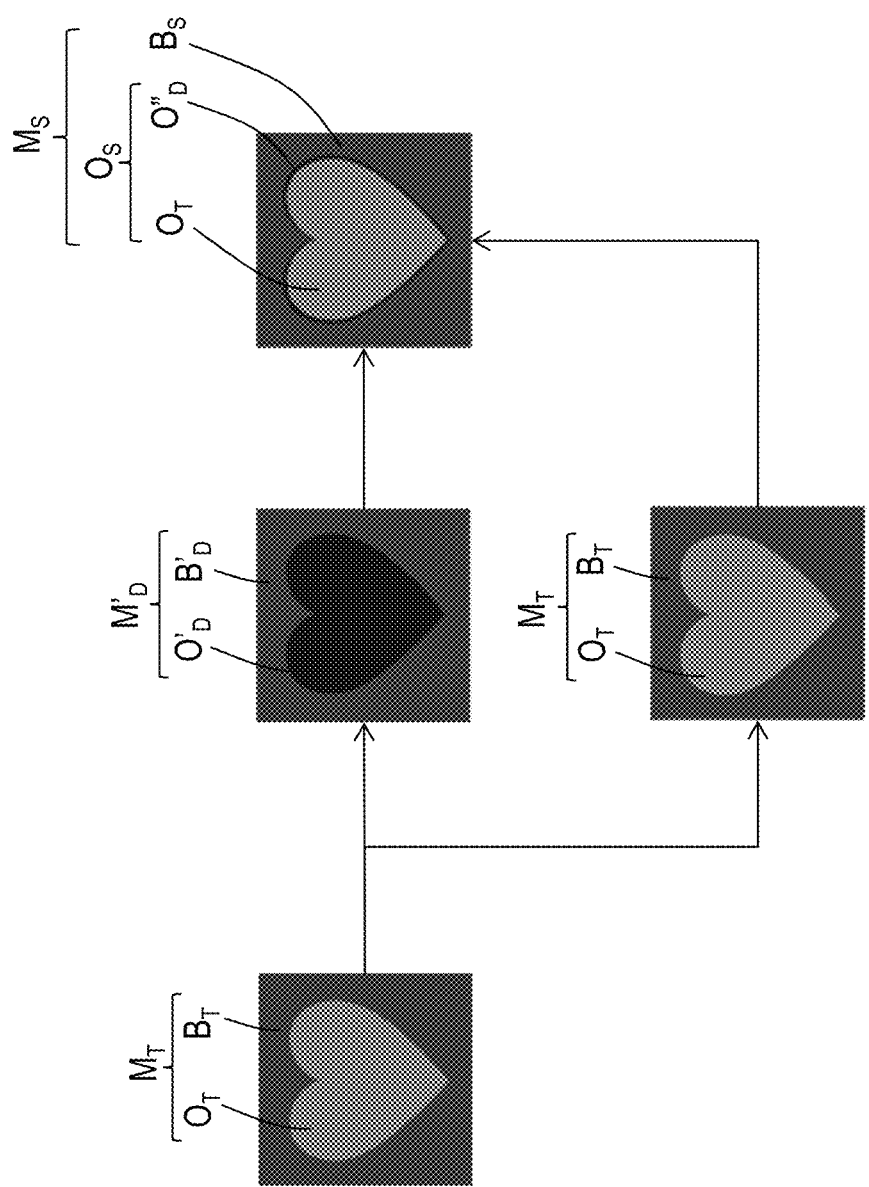
FIG. 11 is a diagram illustrating a part of an input/output image of each process in an image generation method according to an embodiment.

Based on the input dark object image $M_D$ and the input information S=(Mx, My) representing the enlargement factor, the enlargement unit 412 obtains an enlarged dark object image $M'_D$ which is an image including a region obtained by enlarging the dark object $O_D$ in the dark object image $M_D$ by the enlargement factor (Mx, My) and outputs the enlarged dark object image $M'_D$ (FIG. 11). For example, the enlargement unit 412 performs the following processes.

First, the enlargement unit 412 obtains an image (a provisional enlarged dark object image) which adopts a same pixel value as a pixel value of a pixel with a horizontal coordinate value x and a vertical coordinate value y of the dark object image $M_D$ as a pixel value of a pixel with a horizontal coordinate value x' and a vertical coordinate value y'.

$$\begin{pmatrix} x' \\ y' \\ 1 \end{pmatrix} = \begin{pmatrix} Mx & 0 & 0 \\ 0 & My & 0 \\ 0 & 0 & 1 \end{pmatrix} \begin{pmatrix} x \\ y \\ 1 \end{pmatrix} \quad \text{[Formula 1]}$$

An image region corresponding to an object obtained by enlarging the dark object $O_D$ in the provisional enlarged dark object image obtained by this process will be referred to as a provisional enlarged dark object.

In addition, the enlargement unit 412 identifies a region having a same shape as the target image $M_T$ in a state where a center position of the provisional enlarged dark object in the provisional enlarged dark object image is aligned with a center position of the target $O_T$, obtains an image obtained by making the number of vertical and horizontal pixels equal to the number of vertical and horizontal pixels of the target image $M_T$ with respect to the identified region as the enlarged dark object image $NI'D_D$, and outputs the enlarged dark object image $M'_D$. A region corresponding to the provisional enlarged dark object in the enlarged dark object image $M'_D$ will be referred to as an enlarged dark object $O'_D$, and a region other than the enlarged dark object $O'_D$ in the enlarged dark object image $M'_D$ will be referred to as a background region $B'_D$.

«Composition Process (Step S414)»

Next, the enlarged dark object image $M'_D$ obtained by the enlargement unit 412 and the target image $M_T$ input to the image generation apparatus 41 are input to the composition processing unit 414. Based on the input enlarged dark object image $M'_D$ and the input target image $M_T$, the composition processing unit 414 obtains and outputs a composited target image $M_S$ which is an image including a region (a final target $O_S$) obtained by performing layer composition so that the target $O_T$ is given a higher priority than the enlarged dark object $O'_D$ (in other words, so that the layer of the target $O_T$ is positioned on an upper side or a front surface side of the layer of the enlarged dark object $O'_D$) while retaining a position of the enlarged dark object $O'_D$ in the enlarged dark object image $M'_D$ and a position of the target $O_T$ in the target image $M_T$ (in other words, retaining positions of the enlarged dark object image $M'_D$ and the target image $M_T$), and a remaining region (the background region $B_S$) (FIG. 11).

It should be noted that, when creating such an illusion so as to repeat enlargement and reduction as will be described later, a maximum width of the dark region $O''_D$ in the composited target image $M_S$ is desirably a width corresponding to a visual angle of 0.2 degrees or a vicinity thereof. For example, when the composited target image $M_S$ or a final target $O_S$ is set on the assumption that the composited target image $M_S$ or the final target $O_S$ is to be viewed from a position approximately 100 centimeters away, the maximum width of the dark region $O''_D$ is desirably approximately 3.5 millimeters. In consideration thereof, the enlargement factor represented by the information S to be input to the enlargement unit 412 is desirably determined so that the maximum width of the dark region $O''_D$ is set to such a desirable value. It should be noted that, since a maximum width of the dark region $O''_D$ may be adopted so as to create a visual angle equal to or more than 0.2 degrees or equal to or less than 0.2 degrees, the enlargement factor represented by the information S to be input to the enlargement unit 412 is arbitrary. However, as the maximum width of the dark region $O''_D$ widens (narrows) relative to a width of a visual perception of 0.2 degrees, a created illusory effect diminishes.

Figure 14A:
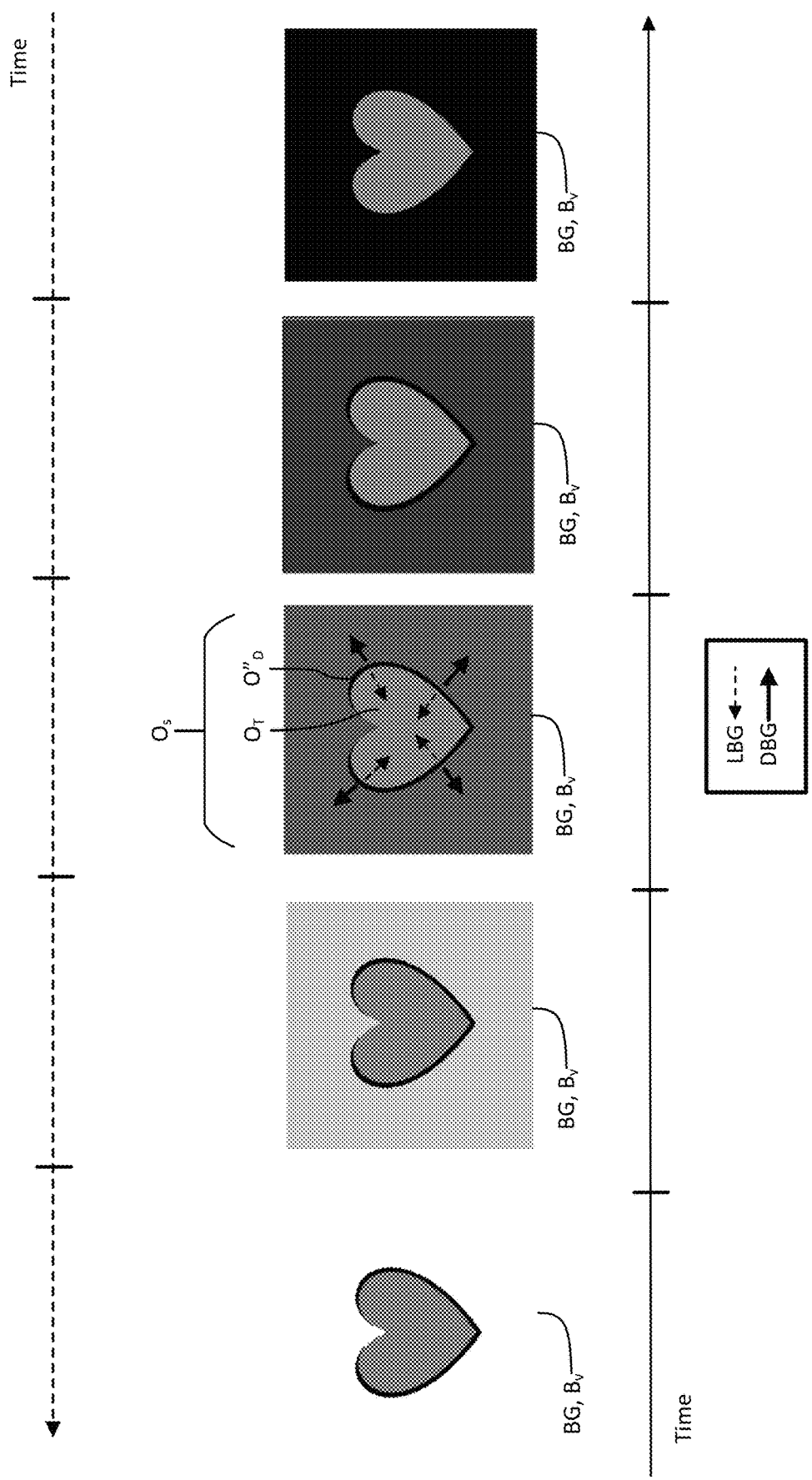
FIGS. 14A and 14B are diagrams for illustrating an illusory effect produced by a final target and a background of which luminance periodically varies.

After obtaining the composited target image $M_S$, the present embodiment is the same as the first embodiment or the first and second modifications thereof. In addition, luminance and colors of the target $O_T$, the dark region $O''_D$, the background BG, and the image By of the background are the same as the third modification of the first embodiment. Accordingly, an illusion can be created in which the target $O_T$ appears to be repetitively enlarged and reduced. For example, as illustrated in FIG. 14A, the observer viewing a situation where the final target object O in this case is arranged in the background BG of which overall luminance is the same at each time point and of which luminance periodically varies over time has an illusion that the target $O_T$ of the final target object O is being reduced in a direction LBG when a gradient of a time variation of a luminance value of the background BG is positive, and has an illusion that the target $O_T$ is being enlarged in a direction DBG of the dark region $O''_D$ when the gradient of the time variation of the luminance value of the background BG is negative. In this manner, the observer can be given an illusion in which the target $O_T$ appears to be enlarged and reduced.

<Case of Using Target and Light Object>

Next, a case where a target and a light object are used will be described.

<Configuration>

Figure 12:
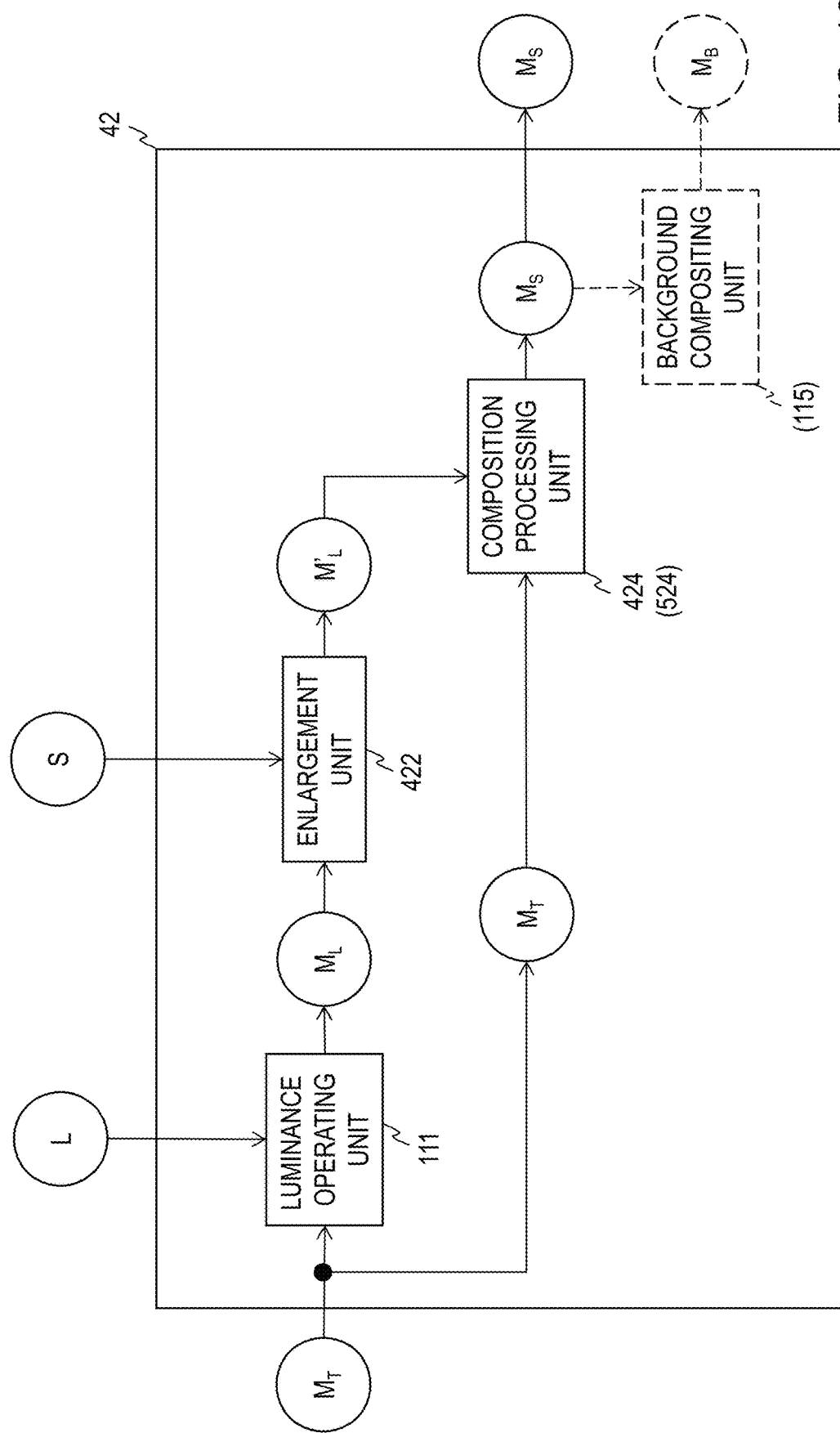
FIG. 12 is a block diagram illustrating a functional configuration of an image generation apparatus according to an embodiment.

As illustrated in FIG. 12, an image generation apparatus 42 in this case has the luminance operating unit 111, an enlargement unit 422, and a composition processing unit 424.

<Image Generation Process>

In an image generation process in this case, the image generation apparatus 42 first executes the process of step S110 and the process of obtaining a light object image $M_L$ among step S111 described in the first embodiment. In addition, the light object image $M_L$ obtained in the process of S111 is input to the enlargement unit 422.

«Enlargement Process (Step S422)»

The light object image $M_L$ obtained in the process of S111 by the luminance operating unit 111 and information S representing an enlargement factor are input to the enlargement unit 422. The information S representing an enlargement factor may be input from outside of the image generation apparatus 42 or may be stored in advance and input from a storage unit (not illustrated) in the image generation apparatus 42. When the enlargement unit 422 uses affine transformation, (Mx, My) which is a set of an enlargement factor Mx (Mx>1) in a horizontal direction and an enlargement factor My (My>1) in a vertical direction is input to the enlargement unit 422 as the information S representing an enlargement factor.

Figure 13:
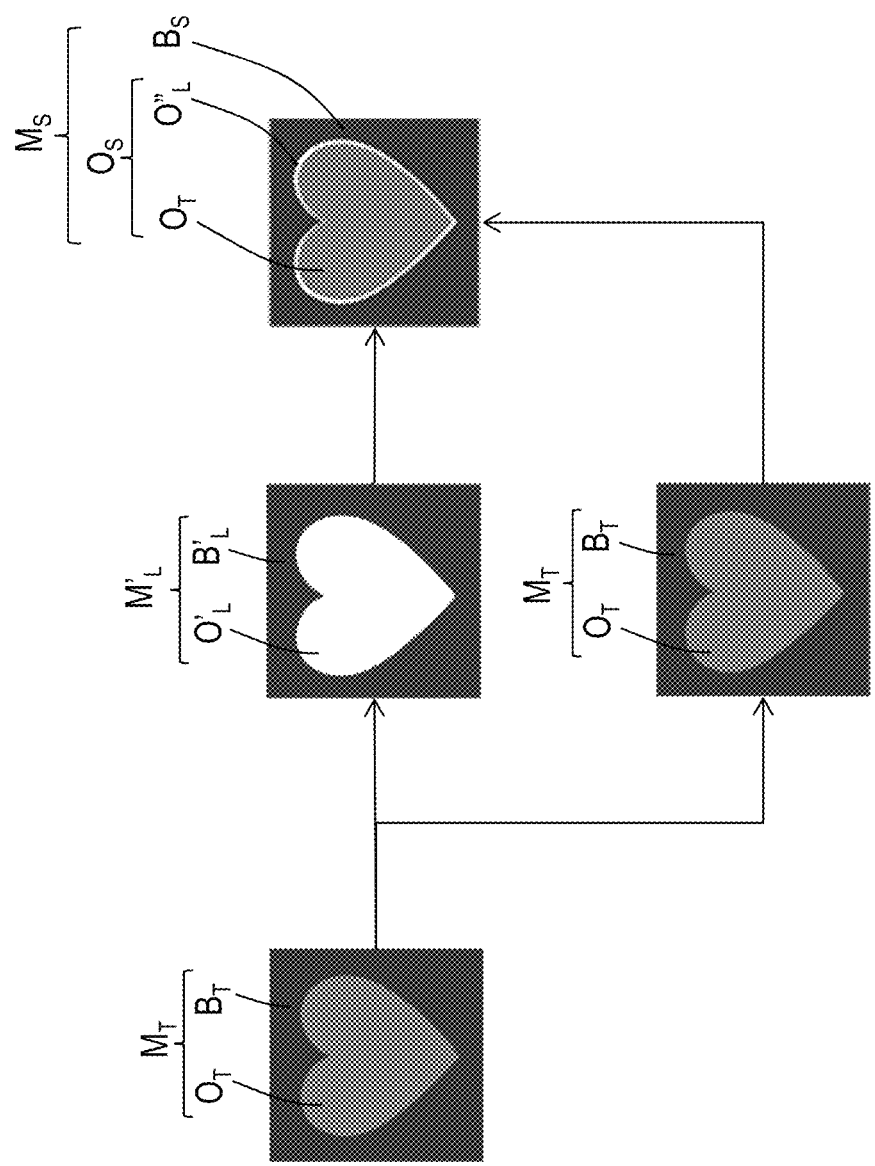
FIG. 13 is a diagram illustrating a part of an input/output image of each process in an image generation method according to an embodiment.

Based on the input light object image $M_L$ and the input information S=(Mx, My) representing the enlargement factor, the enlargement unit 422 obtains an enlarged light object image $M'_L$ which is an image including a region obtained by enlarging the light object $O_L$ in the light object image $M_L$ by the enlargement factor (Mx, My) and outputs the enlarged light object image $M'_L$ (FIG. 13). For example, the enlargement unit 422 performs the following processes.

First, the enlargement unit 422 obtains an image (a provisional enlarged light object image) which adopts a same pixel value as a pixel value of a pixel with a horizontal coordinate value x and a vertical coordinate value y of the light object image $M_L$ as a pixel value of a pixel with a horizontal coordinate value x' and a vertical coordinate value y'.

$$\begin{pmatrix} x' \\ y' \\ 1 \end{pmatrix} = \begin{pmatrix} Mx & 0 & 0 \\ 0 & My & 0 \\ 0 & 0 & 1 \end{pmatrix} \begin{pmatrix} x \\ y \\ 1 \end{pmatrix} \quad \text{[Formula 2]}$$

An image region corresponding to an object obtained by enlarging the light object $O_L$ in the provisional enlarged light object image obtained by this process will be referred to as a provisional enlarged light object.

In addition, the enlargement unit 422 identifies a region having a same shape as the target image $M_T$ in a state where a center position of the provisional enlarged light object in the provisional enlarged light object image is aligned with a center position of the target $C_T$, obtains an image obtained by making the number of vertical and horizontal pixels equal to the number of vertical and horizontal pixels of the target image $M_T$ with respect to the identified region as the enlarged light object image $M'_L$, and outputs the enlarged light object image $M'_L$. A region other than the enlarged light object $O'_L$ of the enlarged light object image $M'_L$ will be referred to as a background region $B'_L$.

«Composition Process (Step S424)»

Next, the enlarged light object image $M'_L$ obtained by the enlargement unit 422 and the target image $M_T$ input to the image generation apparatus 42 are input to the composition processing unit 424. Based on the input enlarged light object image $M'_L$ and the input target image $M_T$, the composition processing unit 424 obtains and outputs a composited target image $M_S$ which is an image including a region (a final target $O_S$) obtained by performing layer composition so that the target $O_T$ is given a higher priority than the enlarged light object $O'_L$ (in other words, so that the layer of the target $O_T$ is positioned on an upper side or a front surface side of the layer of the enlarged light object $O'_L$) while retaining a position of the enlarged light object $O'_L$ in the enlarged light object image $M'_L$ and a position of the target $O_T$ in the target image $M_T$ (in other words, retaining positions of the enlarged light object image $M'_L$ and the target image $M_T$), and a remaining region (the background region $B_S$) (FIG. 13).

It should be noted that, when creating such an illusion so as to repeat enlargement and reduction as will be described later, a maximum width of the light region $O''_L$ in the composited target image $M_S$ is desirably a width corresponding to a visual angle of 0.2 degrees or a vicinity thereof. For example, when the composited target image $M_S$ or a final target $O_S$ is set on the assumption that the composited target image $M_S$ or the final target $O_S$ is to be viewed from a position approximately 100 centimeters away, the maximum width of the light region $O''_L$ is desirably approximately 3.5 millimeters. In consideration thereof, the enlargement factor represented by the information S to be input to the enlargement unit 422 is desirably determined so that the maximum width of the light region $O''_L$ is set to such a desirable value. It should be noted that, since a maximum width of the light region $O''_L$ may be adopted so as to create a visual angle equal to or more than 0.2 degrees or equal to or less than 0.2 degrees, the enlargement factor represented by the information S to be input to the enlargement unit 422 is arbitrary. However, as the maximum width of the light region $O''_L$ widens (narrows) relative to a width of a visual perception of 0.2 degrees, a created illusory effect diminishes.

Figure 14B:
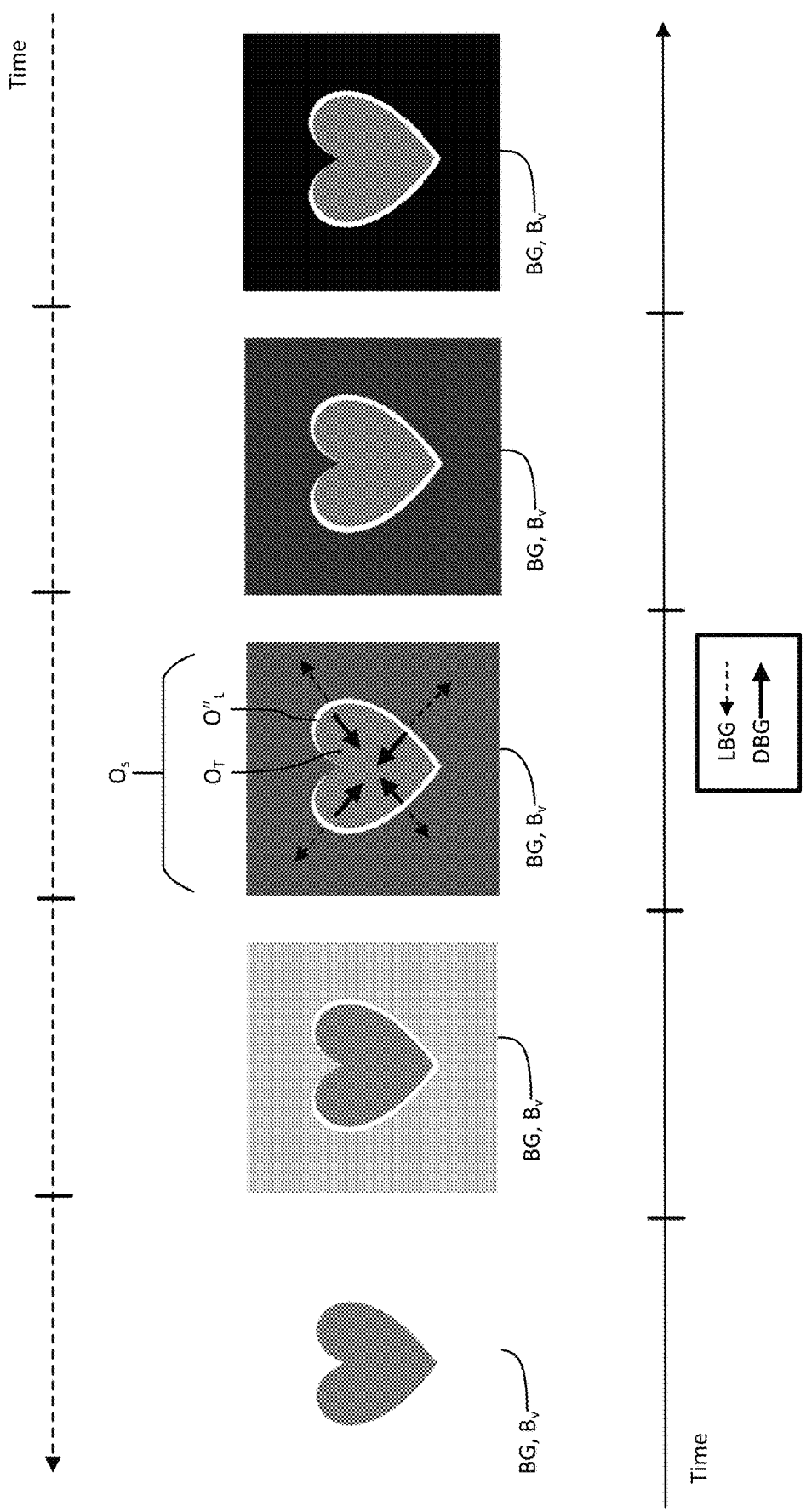

After obtaining the composited target image $M_S$, the present embodiment is the same as the first embodiment or the first and second modifications thereof. In addition, luminance and colors of the target $O_T$, the light region $O''_L$, the background BG, and the image By of the background are the same as the third modification of the first embodiment. Accordingly, an illusion can be created in which the target $O_T$ appears to be repetitively enlarged and reduced. For example, as illustrated in FIG. 14B, the observer viewing a situation where the final target object O in this case is arranged in the background BG of which overall luminance is the same at each time point and of which luminance periodically varies over time has an illusion that the target $O_T$ of the final target object O is being enlarged in the direction LBG of the light region $O''_L$ when a gradient of a time variation of a luminance value of the background BG is positive, and has an illusion that the target $O_T$ is being reduced in the direction DBG when the gradient of the time variation of the luminance value of the background BG is negative. In this manner, the observer can be given an illusion in which the target $O_T$ appears to be enlarged and reduced.

Feature of Present Embodiment

In the present embodiment, an illusion can be created in which the target $O_T$ which should not be moving appears to be repetitively enlarged and reduced on a background. In addition, in the present embodiment, in addition to a rectangular target such as that described in NPL1, an illusion featuring motions that cannot be realized by PTL1 can be created regardless of how complex a contour shape of the target $O_T$ is.

Fifth Embodiment

In the present embodiment, a method of causing an illusion that apart of a target appears to move on a background of which luminance periodically varies will be described. Since the present embodiment includes a case where the target and a dark object are used and a case where the target and a light object are used, each case will be described.

While the image generation apparatus according to the second embodiment obtains the composited target image $M_S$ by compositing the additional light region $aO_L$, the additional dark region $aO_D$, and the target $O_T$, the image generation apparatus according to the present embodiment obtains the composited target image $M_S$ by compositing the additional dark region $aO_D$ and the target $O_T$ or the additional light region $aO_L$ and the target $O_T$. Therefore, an image generation apparatus 51 in a case where a target and a dark object are used according to the present embodiment includes the luminance operating unit 111, the moving unit 112, the additional dark region determination unit 216, and the composition processing unit 214 but does not include the moving unit 113 and the additional light region determination unit 217 among the units illustrated in FIG. 7. In addition, an image generation apparatus 52 in a case where a target and a light object are used according to the present embodiment includes the luminance operating unit 111, the moving unit 113, the additional light region determination unit 217, and the composition processing unit 214 but does not include the moving unit 112 and the additional dark region determination unit 216 among the units illustrated in FIG. 7.

<Case of Using Target and Dark Object>

First, a case where a target and a dark object are used will be described.

First, among the processes performed by the image generation apparatus 21 according to the second embodiment, the image generation apparatus 51 executes the process of step S110, the process of obtaining a dark object image $M_c$ among step S111, the process of step S112, and the process of step S216. In addition, the target image $M_T$ input to the image generation apparatus 51 and the additional dark region image $aM_D$ obtained by the additional dark region determination unit 216 in step S216 are input to the composition processing unit 214 and a composition process at the composition processing unit 214 is performed. For example, the following two methods are available for the composition process.

In a first method, the composition processing unit 214 obtains and outputs, as the composited target image $M_S$, an image in which a pixel value of a pixel corresponding to each pixel of the additional dark region $aO_D$ in the additional dark region image $aM_D$ among pixels of the target image $M_T$ is changed to a same pixel value as the additional dark region $aO_D$. In this method, in the composited target image $M_S$, a region adopting the pixel value of the additional dark region $aO_D$ is to be a dark region $O''_D$, and a region constituted by the target $O_T$ and the dark region $O''_D$ is to be a final target $O_S$. In addition, a region other than the final target $O_S$ is to be a background region $B_S$.

In a second method, first, the composition processing unit 214 adopts a specific pixel value that differs from any of the pixel value of the additional dark region $aO_D$ and the pixel value of the target $O_T$ as a pixel value E. Next, the composition processing unit 214 obtains an image $aM_D'$ in which, among an image region with a same rectangular shape as the target image $M_T$ on a two-dimensional xy plane, a pixel value of a pixel corresponding to each pixel of the additional dark region $aO_D$ in the additional dark region image $aM_D$ is set to a same pixel value as the additional dark region $aO_D$ and a pixel value of a pixel not corresponding to a pixel of the additional dark region $aO_D$ in the additional dark region image $aM_D$ is set to the pixel value E. Furthermore, the composition processing unit 214 obtains an image $M_T'$ in which a pixel value of the background region $B_T$ in the target image $M_T$ is set to the pixel value E. Moreover, the composition processing unit 214 obtains a pixel value of each pixel in the composited target image $M_S$ as described below.

With respect to a pixel of which a value of a sum of a pixel value of the image $aM_D'$ and a pixel value of the image $M_T'$ is equal to twice the pixel value E, the composition processing unit 214 sets a pixel value of the pixel in the composited target image $M_S$ to the pixel value E. In addition, among pixels of which a value of a sum of a pixel value of the image $aM_D'$ and a pixel value of the image $M_T'$ is not equal to twice the pixel value E, with respect to a pixel of which a value obtained by subtracting the pixel value E from the value of the sum is equal to the pixel value of the target image $M_T$, the composition processing unit 214 sets a pixel value of the pixel in the composited target image $M_S$ to a same pixel value as the target image $M_T$. Furthermore, among pixels of which a value of a sum of a pixel value of the image $aM_D'$ and a pixel value of the image $M_T'$ is not equal to twice the pixel value E, with respect to a pixel of which a value obtained by subtracting the pixel value E from the value of the sum is equal to the pixel value of the additional dark region $aO_D$, the composition processing unit 214 sets a pixel value of the pixel in the composited target image $M_S$ to a same pixel value as the additional dark region $aO_D$. After performing these processes, the composition processing unit 214 outputs the composited target image $M_S$. In this method, in the composited target image $M_S$, a region where the pixel value is set to a same pixel value as the target image $M_T$ is to be a target $O_T$, a region where the pixel value is set to a same pixel value as the additional dark region $aO_D$ is to be a dark region $O''_D$, and a region constituted by the target $O_T$ and the dark region $O''_D$ is to be a final target $O_S$. In addition, a region where the pixel value is set to E is to be the background region $B_S$.

<Case of Using Target and Light Object>

Next, a case where a target and a light object are used will be described.

First, among the processes performed by the image generation apparatus 21 according to the second embodiment, the image generation apparatus 52 executes the process of step S110, the process of obtaining a light object image $M_L$ among step S111, the process of step S113, and the process of step S217. In addition, the target image $M_T$ input to the image generation apparatus 52 and the additional light region image $aM_L$ obtained by the additional light region determination unit 217 in step S217 are input to the composition processing unit 214 and a composition process at the composition processing unit 214 is performed. For example, the following two methods are available for the composition process.

In a first method, the composition processing unit 214 obtains and outputs, as the composited target image $M_S$, an image in which a pixel value of a pixel corresponding to each pixel of the additional light region $aO_L$ in the additional light region image $aM_L$ among pixels of the target image $M_T$ is changed to a same pixel value as the additional light region $aO_L$. In this method, in the composited target image $M_S$, a region adopting the pixel value of the additional light region $aO_L$ is to be a light region $O''_L$, and a region constituted by the target $O_T$ and the light region $O''_L$ is to be a final target $O_S$. In addition, a region other than the final target $O_S$ is to be a background region $B_S$.

In a second method, first, the composition processing unit 214 adopts a specific pixel value that differs from any of the pixel value of the additional light region $aO_L$ and the pixel value of the target $O_T$ as a pixel value E. Next, the composition processing unit 214 obtains an image $aM_L'$ in which, among an image region with a same rectangular shape as the target image $M_T$ on a two-dimensional xy plane, a pixel value of a pixel corresponding to each pixel of the additional light region $aO_L$ in the additional light region image $aM_L$ is set to a same pixel value as the additional light region $aO_L$ and a pixel value of a pixel not corresponding to a pixel of the additional light region $aO_L$ in the additional light region image $aM_L$ is set to the pixel value E. Furthermore, the composition processing unit 214 obtains an image $M_T'$ in which a pixel value of the background region $B_T$ in the target image $M_T$ is set to the pixel value E. Moreover, the composition processing unit 214 obtains a pixel value of each pixel in the composited target image $M_S$ as described below.

With respect to a pixel of which a value of a sum of a pixel value of the image $aM_L'$ and a pixel value of the image $M_T'$ is equal to twice the pixel value E, the composition processing unit 214 sets a pixel value of the pixel in the composited target image $M_S$ to the pixel value E. In addition, among pixels of which a value of a sum of a pixel value of the image $aM_L'$ and a pixel value of the image $M_T'$ is not equal to twice the pixel value E, with respect to a pixel of which a value obtained by subtracting the pixel value E from the value of the sum is equal to the pixel value of the target image $M_T$, the composition processing unit 214 sets a pixel value of the pixel in the composited target image $M_S$ to a same pixel value as the target image $M_T$. Furthermore, among pixels of which a value of a sum of a pixel value of the image $aM_L'$ and a pixel value of the image $M_T'$ is not equal to twice the pixel value E, with respect to a pixel of which a value obtained by subtracting the pixel value E from the value of the sum is equal to the pixel value of the additional light region $aO_L$, the composition processing unit 214 sets a pixel value of the pixel in the composited target image $M_S$ to a same pixel value as the additional light region $aO_L$. After performing these processes, the composition processing unit 214 outputs the composited target image $M_S$. In this method, in the composited target image $M_S$, a region where the pixel value is set to a same pixel value as the target image $M_T$ is to be a target $O_T$, a region where the pixel value is set to a same pixel value as the additional light region $aO_L$ is to be a light region $O''_L$, and a region constituted by the target $O_T$ and the light region $O''_L$ is to be a final target $O_S$. In addition, a region where the pixel value is set to E is to be the background region $B_S$.

It should be noted that, instead of the process of the composition processing unit 214 according to the present embodiment described above, layer composition may be performed which does not use any of the moved dark object image $M'_D$ and the moved light object image $M'_L$ among the layer composition in step S114 which is performed by the composition processing unit 114 of the image generation apparatus 11 according to the first embodiment. In other words, the composited target image $M_S$ may be obtained by performing, among processes to be performed by the image generation apparatus 11 according to the first embodiment, the process of step S110, the process of obtaining the dark object image $M_D$ among step S111, the process of step S112, and the process of performing layer composition of the moved dark object $O'_D$ of the moved dark object image $M'_D$ and the target $O_T$ of the target image $M_T$ so that the target $O_T$ has a higher priority while retaining positions in the respective images. In a similar manner, the composited target image $M_S$ may be obtained by performing, among processes to be performed by the image generation apparatus 11 according to the first embodiment, the process of step S110, the process of obtaining the light object image $M_L$ among step S111, the process of step S113, and the process of performing layer composition of the moved light object $O'_L$ of the moved light object image $M'_L$ and the target $O_T$ of the target image $M_T$ so that the target $O_T$ has a higher priority while retaining positions in the respective images. In addition, in this configuration, instead of the movement process in step S112 and step S113 performed by the image generation apparatus 11 according to the first embodiment, the movement process in step S112' and step S113' performed by the image generation apparatus 11' according to the third embodiment may be performed.

After obtaining the composited target image $M_S$, the present embodiment is the same as the first embodiment or the first and second modifications thereof. In addition, luminance and colors of the target $O_T$, the dark region $O''_D$, the light region $O''_L$, the background BG, and the image $B_V$ of the background are the same as the third modification of the first embodiment. According to the present embodiment, an illusion can be created in which a part of the target $O_T$ which should not be moving appears to be moving on a background. Specifically, an illusion can be created in which a vicinity of the dark region $O''_D$ or the light region $O''_L$ among the target $O_T$ appears to be moving.

Sixth Embodiment

In the present embodiment, a method of giving a plurality of illusions to one target will be described. Specifically, descriptions will be given with respect to a method of giving all of or any two or more illusions of the plurality of image generation processes presented in the five embodiments and the modifications thereof to one target, a method of imparting a plurality of image generation processes with different movement amounts to one target, a method of imparting a plurality of image generation processes with different rotation angles to one target, and a method of imparting a plurality of image generation processes with different enlargement factors to one target.

<Configuration>

Figure 15:
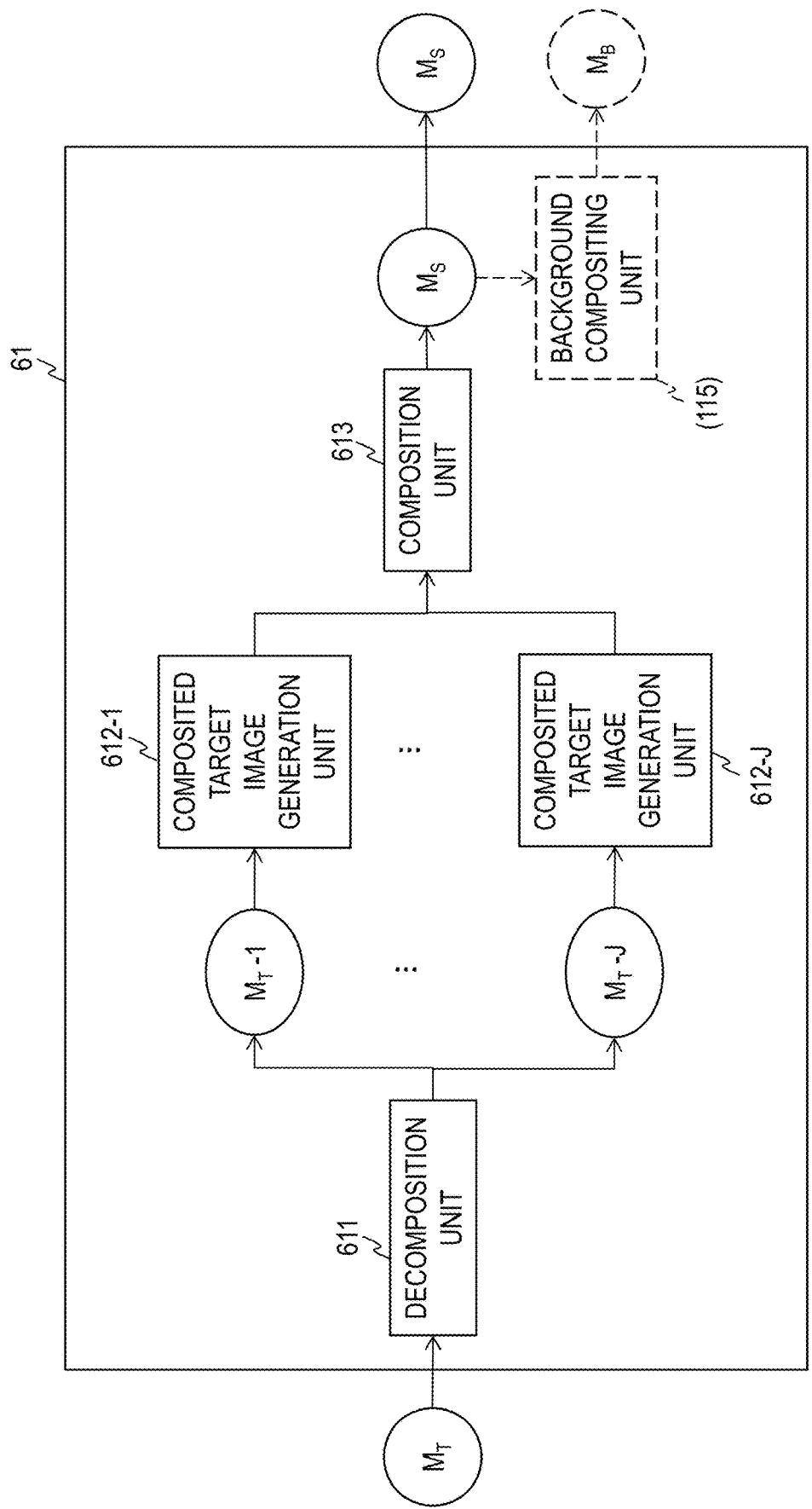
FIG. 15 is a block diagram illustrating a functional configuration of an image generation apparatus according to an embodiment.

As illustrated in FIG. 15, an image generation apparatus 61 according to the present embodiment has a decomposition unit 611, J-number of composited target image generation units 612-1 to 612-J, and a composition unit 613. Note that J is an integer that is equal to or larger than 1. In addition, the composited target image generation units 612-1 to 612-J are any of the image generation apparatuses described in the first to fifth embodiments.

<Image Generation Process>

Figure 16:
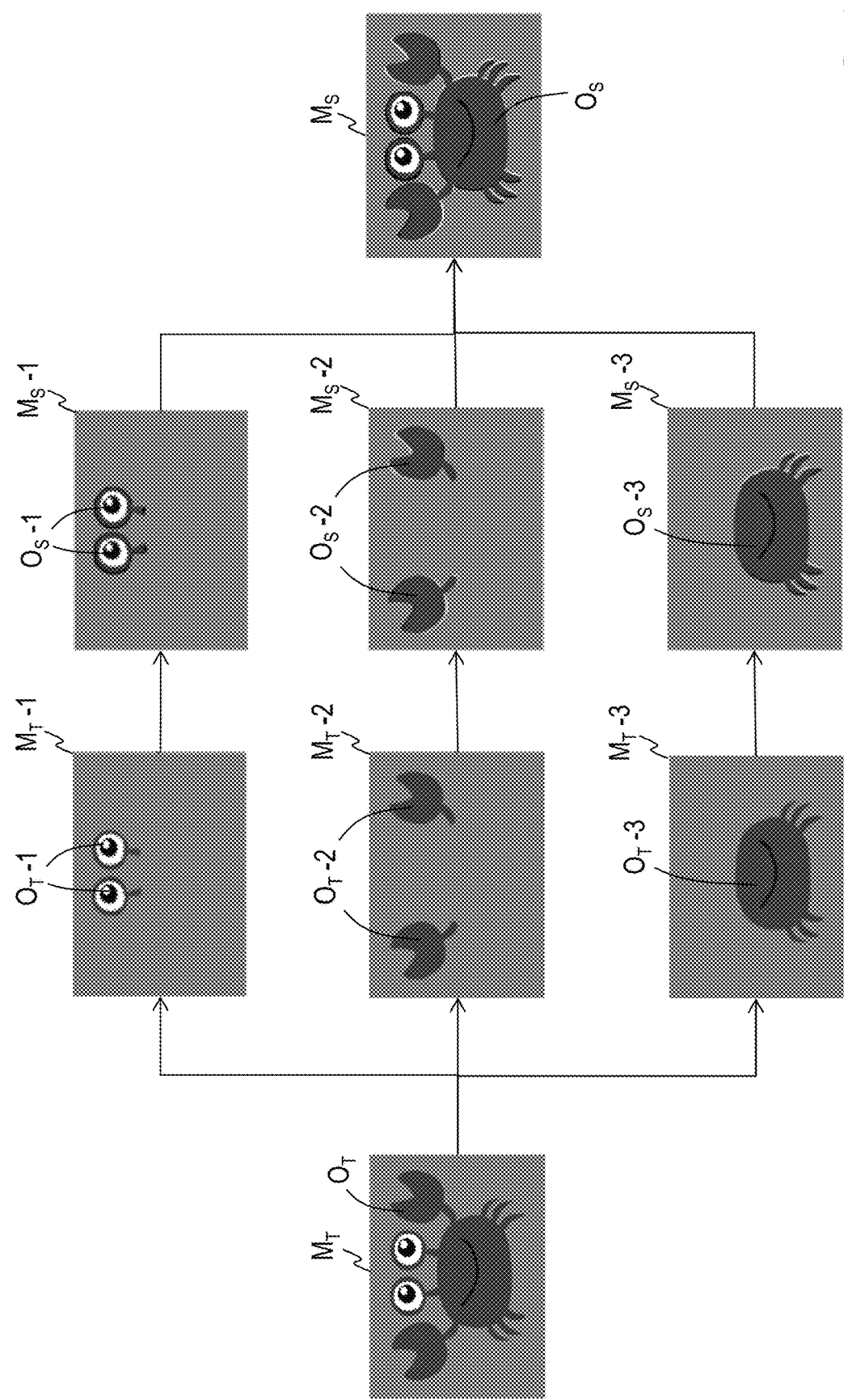
FIG. 16 is a diagram illustrating a part of an input/output image of each process in an image generation method according to an embodiment.

Next, an image generation process according to the present embodiment will be described. «Decomposition process (step S611)» First, the target image $M_T$ including the target $O_T$ is input to the decomposition unit 611 (FIG. 16). In order to impart an illusory effect of different motions to a portion constituting the target $O_T$ in the target image $M_T$, the decomposition unit 611 first decomposes the target $O_T$ into partial targets $O_T$-1 to $O_T$-J and obtains an image (a partial target image $M_T$-j) respectively including a partial target $O_T$-j (where j=1, . . . , J, and J is an integer equal to or larger than 2). There are two methods of performing the decomposition into the partial target s $O_T$-1 to $O_T$-J. One method is a method of obtaining the partial target image $M_T$-j by selecting an image region including each partial target $O_T$-j to be imparted with an illusory effect in the target $O_T$ based on input and compositing the selected image region including the partial target $O_T$-1 with a background image having an arbitrary uniform pixel value. The selection of the image region including each partial target $O_T$-j may be performed using commercially-available image processing software or using other known methods. Another method is a method of obtaining the partial target image $M_T$-j by determining, in advance, the partial target $O_T$-1 to $O_T$-J to be imparted with an illusory effect, determining in which image region in the target image $M_T$ each partial target $O_T$-j is present by having the decomposition unit 611 use a general pattern recognition technique, and compositing the recognized image region including the partial target $O_T$-j and a background having a pixel value that differs from the partial target $O_T$-j. FIG. 16 represents a case where J=3. An illustration of a crab is used as the target $O_T$. A portion of the eyes of the crab is the partial target $O_T$-1, a portion of the claws of the crab is the partial target $O_T$-2, and a trunk portion of the crab is the partial target $O_T$-3. Each obtained partial target image $M_T$-j is sent to the composited target image generation unit 612-j.

«Composited Target Image Generation Process (Step S612-j)»

The partial target $O_T$-j in each partial target image $M_T$-j is subjected to a process of giving any of the parallel movement illusion presented in the first and second embodiments, the rotation sensation presented in the third embodiment, the enlargement/reduction illusion presented in the fourth embodiment, and the illusion of movement of a part presented in the fifth embodiment. When the composited target image generation unit 612-j gives a parallel movement illusion to the partial target $O_T$-j, the composited target image generation unit 612-j executes the image generation process described in the first and second embodiments and the modifications thereof with the partial target image $M_T$-j including the partial target $O_T$-j as the target image $N_T$, obtains a composited target image $M_S$ including a final target $O_S$, and outputs the obtained composited target image $M_S$ as a composited partial target image $M_S$-j including a composited partial target $O_S$-j. When the composited target image generation unit 612-j gives a rotation illusion to the partial target $O_T$-j, the composited target image generation unit 612-j executes the image generation process described in the third embodiment with the partial target image $M_T$-j including the partial target $O_T$-j as the target image $N_T$, obtains a composited target image $M_S$ including a final target $O_S$, and outputs the obtained composited target image $M_S$ as a composited partial target image $M_S$-j including a composited partial target $O_S$-j. When the composited target image generation unit 612-j gives an enlargement/reduction illusion to the partial target $O_T$-j, the composited target image generation unit 612-j executes the image generation process described in the fourth embodiment with the partial target image $M_T$-j including the partial target $O_T$-j as the target image $M_T$, obtains a composited target image $M_S$ including a final target $O_S$, and outputs the obtained composited target image $M_S$ as a composited partial target image $M_S$-j including a composited partial target $O_S$-j. When the composited target image generation unit 612-j gives an illusion of movement of a part to the partial target $O_T$-j, the composited target image generation unit 612-j executes the image generation process described in the fifth embodiment with the partial target image $M_T$-j including the partial target $O_T$-j as the target image $M_T$, obtains a composited target image $M_S$ including a final target $O_S$, and outputs the obtained composited target image $M_S$ as a composited partial target image $M_S$-j including a composited partial target $O_S$-j. Which illusion is to be given may be determined in advance and stored in a storage unit (not illustrated) in the image generation apparatus 61, or the image generation apparatus 61 may be provided with an input unit (not illustrated) and which illusion is to be given may be determined based on an input to the input unit from a user or, in other words, an input accepted by the input unit.

In the example in FIG. 16, the composited target image generation unit 612-1 executes the image generation process described in the fourth embodiment in order to impart an effect of the enlargement/reduction illusion to the partial target $O_T$-1 which is a portion of the eyes of the crab. In addition, the composited target image generation unit 612-2 executes the image generation process described in the third embodiment in order to impart an effect of the rotation illusion to the partial target $O_T$-2 which is a portion of the claws of the crab. Furthermore, the composited target image generation unit 612-2 executes the image generation process described in the first or second embodiment in order to impart an effect of the parallel movement illusion to the partial target $O_T$-3 which is a trunk portion of the crab.

Accordingly, a light region and/or a dark region has been added to the eyes of the crab (the composited partial target $O_S$-1) which is one of the partial targets in order to give an enlargement/reduction illusion, a light region and/or a dark region has been added to the portion of the claws of the crab (the composited partial target $O_S$-2) which is one of the partial target s in order to give a rotation illusion, and a light region and/or a dark region has been added to the trunk portion of the crab (the composited partial target $O_S$-3) which is one of the partial targets in order to give a parallel movement illusion. A composition process for adding a light region and/or a dark region is as described in the respective embodiments.

It should be noted that a same image generation process may be performed by a plurality of composited target image generation units among the composited target image generation units 612-1 to 612-J. In this case, the movement amount D of the image generation processes according to the first, second, and fifth embodiments may be differentiated among the plurality of composited target image generation units. For example, a certain movement amount $D_1$ may be used in the composited target image generation unit 612-$j_1$ and a movement amount $D_2$ which is larger than the movement amount $D_1$ may be used in the composited target image generation unit 612-$j_3$. It is needless to say that three or more movement amounts with different values respectively associated with three or more composited target image generation units may be used. In addition, in doing so, at least any of Dx and Dy which are positive numbers in the first embodiment may be changed to a negative number. In a similar manner, the rotation angle D' of the image generation process according to the third embodiment may be differentiated among the plurality of composited target image generation units and, in doing so, D' may be changed to a negative number. In a similar manner, the enlargement factor of the image generation process according to the fourth embodiment may be differentiated among the plurality of composited target image generation units.

«Composition Process (Step S613)»

The composited partial target images $M_S$-1 to $M_S$-J are input to the composition unit 613. By compositing the composited partial target images $M_S$-1 to $M_S$-J, the composition unit 613 obtains and outputs an image (a composited target image $M_S$) including a final target $O_S$. There are two methods to composite the composited partial target images $M_S$-1 to $M_S$-J in order to generate the composited target image $M_S$ as described below.

First, in a first method, when a light region is included in each composited partial target image $M_S$-j, the composition unit 613 obtains the composited target image $M_S$ by setting a same value as a pixel value of each pixel in the light region in each composited partial target image $M_S$-j as a pixel value of each corresponding pixel in the target image $M_T$, and when a dark region is included in each composited partial target image $M_S$-j, the composition unit 613 obtains the composited target image $M_S$ by setting a same value as a pixel value of each pixel in the dark region in each composited partial target image $M_S$-j as a pixel value of each corresponding pixel in the target image $M_T$.

In a second method, first, the composition unit 613 obtains an image M'S-j by setting a pixel value of an image region other than the composited partial target $O_S$-j of the composited partial target image $M_S$-j to a pixel value F which is a specific pixel value not included in any of the composited partial targets $O_S$-1 to $O_S$-J. Next, with respect to a pixel of which a value of a sum of pixel values of all images $M'_S$-1 to $M'_S$-J is equal to J-times the pixel value F, the composition unit 613 sets a pixel value of the pixel in the composited target image $M_S$ to the pixel value F. In addition, with respect to a pixel of which a value of a sum of pixel values of all images $M'_S$-1 to $M'_S$-J is not equal to J-times the pixel value F, the composition unit 613 sets a pixel value of the pixel in the composited target image $M_S$ to a value obtained by subtracting J−1 times the pixel value F from the value of the sum. After performing these processes, the composition unit 613 outputs the composited target image $M_S$.

After obtaining the composited target image $M_S$, the present embodiment is the same as the first or the first and second modifications thereof. In addition, luminance and colors of the target $O_T$, the dark region $O''_D$, the background BG, and the image By are the same as the third modification of the first embodiment.

Seventh Embodiment

In the first to third embodiments and the modifications thereof, a final target object O (FIG. 3: printed or cut out final target object O) obtained by cutting out a printed object $PM_S$ on which a composited target image $M_S$ has been printed is arranged on a background BG of which luminance periodically varies or a final target $O_S$ is composited on an image By of a background of which luminance periodically varies (FIG. 4). In a seventh embodiment, instead of compositing a target image $M_T$ (an image including a target $O_T$), a dark object image $M_D$ (an image including a dark object $O_D$), and a light object image $M_L$ (an image including a light object $O_L$) in advance, an object set made of three objects (three objects with approximately the same contour shape but mutually different in luminance) including a target object, a dark target object, and a light target object may be created by respectively printing the target $O_T$, the dark object $O_D$, and the light object $O_L$ on a flat surface of an object (for example, paper, wood, cloth, glass, synthetic resin, or metal) and cutting out the obtained printed objects along respective contour lines of the target $O_T$, the dark object $O_D$, and the light object $O_L$.

An object set created as described above can be used by a user through sales or distribution. The user having obtained the object set superimposes the light target object, the dark target object, and the target object included in the object set onto a background of which luminance periodically varies. In doing so, the target object is superimposed on top (a foremost surface as seen from an observer). In addition, the light target object and the dark target object are superimposed at different positions in mutually different directions (a straight direction or a rotation direction) with respect to the target object so as to be partially visible. In other words, the light target object, the dark target object, and the target object are incompletely superimposed and arranged on a background (a background object) of which luminance periodically varies. Accordingly, the user can enjoy an illusion that a target which is actually not moving appears to be moving. An amount of the difference in positions at this point is desirably within a visual angle of 0.2 degrees.

When setting an amount of the difference in positions between the light target object and the target object and/or an amount of the difference in positions between the dark target object and the target object to be within a visual angle of 0.2 degrees, for example, a comparison with the final target object O (FIG. 3) printed and cut out according to the method described in the first embodiment and the like may be performed. For example, when aligning a position of the target when superimposing the light target object, the dark target object, and the target object with a position of the target $O_T$ of the printed and cut out final target object O, the positions of the light target object and/or the dark target object are adjusted so that the light target object and/or the dark target object does not appear to protrude from the final target $O_S$ (FIG. 3) of the final target object O. Accordingly, the amount of the difference in positions between the light target object and the target object and/or an amount of the difference in positions between the dark target object and the target object can be set to be within a visual angle of 0.2 degrees. In other words, the object set may be an object set made up of four objects, created by adding the final target object O to be used for comparison to the target object, the dark target object, and the light target object.

Alternatively, there is a method of using an image photography apparatus typified by a digital camera. An object set in which a light target object, a dark target object, and a target object are superimposed is arranged on a background that is slightly darker than the target object (however, lighter than the dark target object) or a background that is slightly lighter than the target object (however, rank than the light target object) and photographed by the image photography apparatus to obtain an object set image. Next, using a photography distance and a background used when photographing the object set, a printed and cut out final target object O is photographed to obtain a composited target image photographed image. Since a light region in the object set image is a lightest region in the object image, the light region in the object set image can be obtained by a threshold method. Since a dark region in the object set image is a darkest region in the object image, the dark region in the object set image can be obtained by a threshold method. Since a light region in the composited target image photographed image is a lightest region in the composited target image photographed image, the light region in the composited target image photographed image can be obtained by a threshold method. Since a dark region in the composited target image photographed image is a darkest region in the composited target image photographed image, the dark region in the composited target image photographed image can be obtained by a threshold method. An area of the light region in the object set image is compared with an area of the light region in the composited target image photographed image, and the area of the light region in the object set image is set so as to be smaller than the area of the light region in the composited target image photographed image. In addition, an area of the dark region in the object set image is compared with an area of the dark region in the composited target image photographed image, and the area of the dark region in the object set image is set so as to be smaller than the area of the dark region in the composited target image photographed image. Accordingly, the amount of the difference in positions between the light target object and the target object and/or an amount of the difference in positions between the dark target object and the target object can be set to be within 0.2 degrees.

First Modification of Seventh Embodiment

While an example of an object set corresponding to the first to third embodiments has been described in the seventh embodiment, an object set corresponding to the fourth embodiment may be created. Specifically, an object set may be created which is made up of two objects (two objects with approximately similar contour shapes but mutually different in luminance) including a target object obtained by printing the target $O_T$ and cutting out the target $O_T$ along a contour line and an enlarged dark target object or an enlarged light target object obtained by printing the enlarged dark object $O'_D$ or the enlarged light object $O'_L$ and cutting out the enlarged dark object $O'_D$ or the enlarged light object $O'_L$ along a contour line.

An object set created as described above can be used by a user through sales or distribution. The user having obtained the object set superimposes the enlarged light target object and the target object or the enlarged dark target object and the target object included in the object set onto a background of which luminance periodically varies. At this point, the target object is superimposed on top (a front surface as seen from an observer). In addition, in doing so, the enlarged light object and the target object are superimposed so that center positions thereof approximately match each other and the enlarged dark object and the target object are superimposed so that center positions thereof approximately match each other. Accordingly, the user can enjoy an illusion that a target which is actually being neither enlarged nor reduced appears to be repetitively enlarged and reduced.

Second Modification of Seventh Embodiment

In addition, an object corresponding to the fifth embodiment may be created. Specifically, an object set may be created which is made up of two objects (two objects with approximately the same contour shape but mutually different in luminance) including a target object obtained by printing the target $O_T$ and cutting out the target $O_T$ along a contour line and a dark target object or a light target object obtained by printing the dark object $O_D$ or the light object $O_L$ and cutting out the dark object $O_D$ or the light object $O_L$ along a contour line.

An object set created as described above can be used by a user through sales or distribution. The user having obtained the object set superimposes the light target object and the target object or the dark target object and the target object included in the object set onto a background of which luminance periodically varies. In doing so, the target object is superimposed on top (a front surface as seen from an observer) at a different position so that a part of the light target object or the dark target object is visible. In other words, the light target object or the dark target object and the target object are incompletely superimposed and arranged on a background (a background object) of which luminance periodically varies. Accordingly, the user can enjoy an illusion that a part of a target which is actually not moving appears to be moving.

An amount of the difference in positions at this point is desirably within a visual angle of 0.2 degrees. To this end, in a similar manner to the seventh embodiment, the object set may be an object set made up of three objects, created by adding the final target object O to be used for comparison to the target object and the dark target object or the light target object.

Third Modification of Seventh Embodiment

An object set including the object set described in the seventh embodiment and the first and second modifications thereof in plurality may be provided. Different illusions (a parallel movement illusion, a rotation illusion, an enlargement/reduction illusion, and an illusion of movement of a part) can be caused to be perceived by arranging each of the plurality of object sets as described in the seventh embodiment and the first and second modifications thereof on a single background (background object) of which luminance periodically varies. For example, an object set may be adopted which includes J-number of object sets described in the seventh embodiment and the first and second modifications thereof for each of J-number of portions that constitute a single target or, more specifically, an object set may be adopted which includes J-number of object sets corresponding to each of the composited partial targets $O_S$-1 to $O_S$-J according to the sixth embodiment.

An object set created as described above can be used by a user through sales or distribution. By arranging the plurality of object sets as described in the seventh embodiment and the first and second modifications thereof on a single background (background object) of which luminance periodically varies, the user can enjoy an illusion that a target which is actually not moving appears to be moving in various ways.

Eighth Embodiment

Luminance of the target $O_T$ must belong to a range (a variation range of background luminance) between a minimum value and a maximum value of luminance of a background which periodically varies. On the other hand, although luminance of a dark object (an additional dark region) and luminance of a light object (an additional light region) need not belong to the "variation range of background luminance", preferably, the luminance of a dark object (an additional dark region) and the luminance of a light object (an additional light region) also belong to the "variation range of background luminance". For example, by arranging a dark object (an additional dark region) or a light object (an additional light region) having luminance (for example, luminance of which a difference from luminance of the target $O_T$ is equal to or less than a first value) which is close to luminance of the target $O_T$ on a part (for example, above or below the target $O_T$) of a contour of the target $O_T$ and arranging a dark object (an additional dark region) or a light object (an additional light region) having luminance (for example, luminance of which a difference from the luminance of the target $O_T$ is equal to or more than a second value that is larger than the first value) which is slightly distant from the luminance of the target $O_T$ on another part (for example, left or right of the target $O_T$) of the contour of the target $O_T$, a different illusory effect can be imparted when the "variation range of background luminance" is narrow and when the "variation range of background luminance" is wide.

Figure 17A:
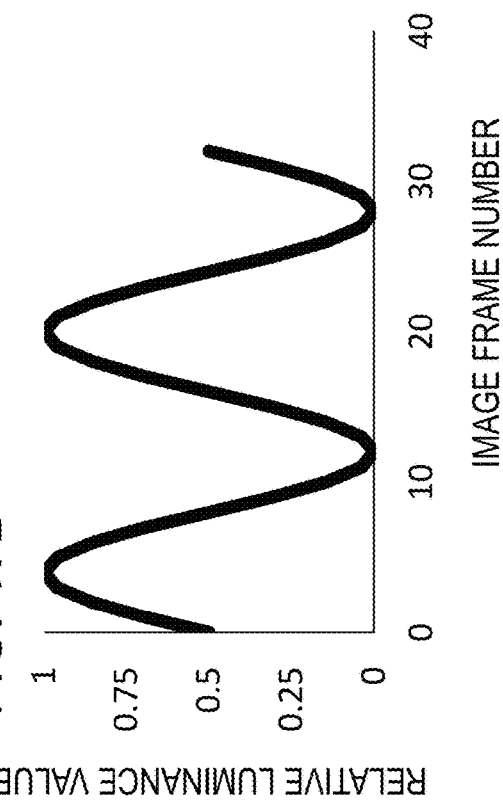
FIGS. 17A to 17D are diagrams illustrating how luminance of a background varies. In the diagrams, an abscissa represents an image frame number of the background and an ordinate represents a relative luminance value.
Figure 17B:
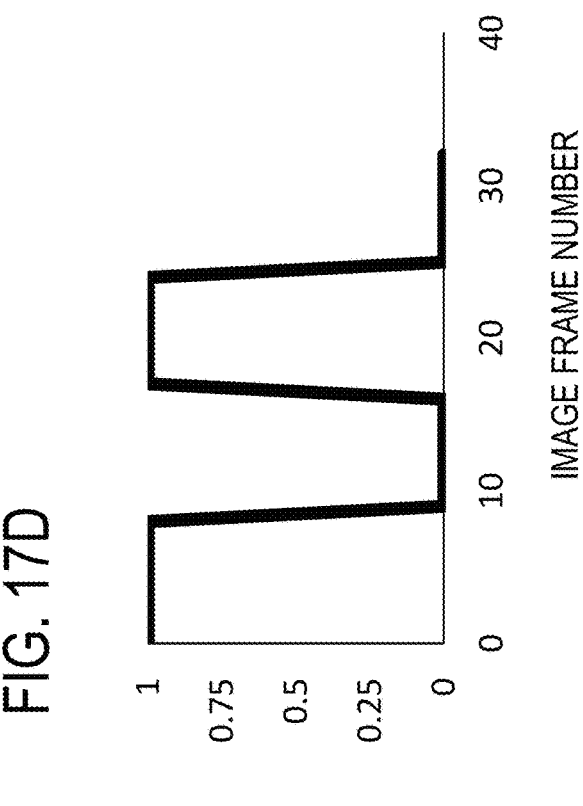
Figure 17C:
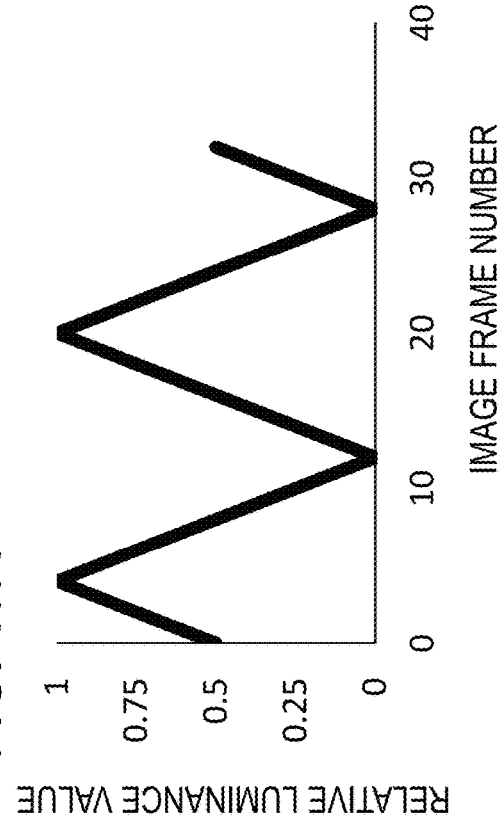
Figure 17D:
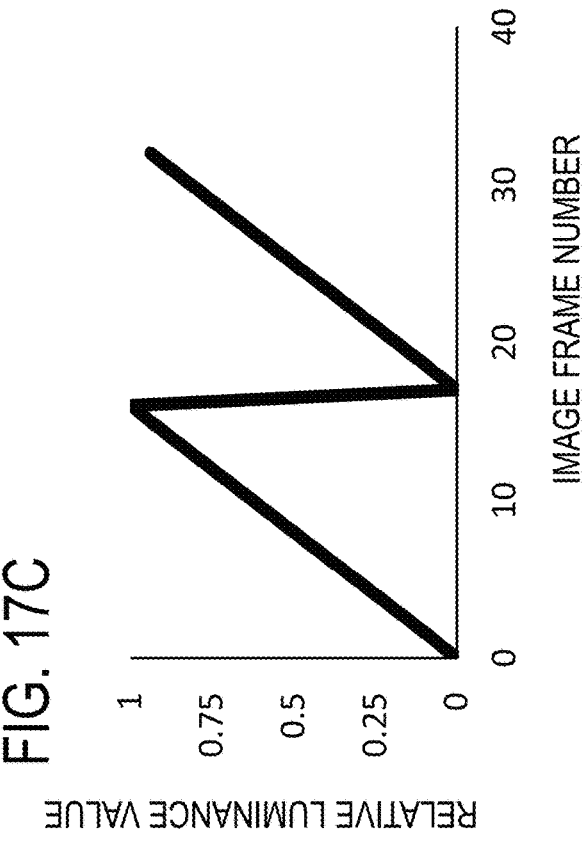

With a background of which luminance periodically varies, luminance of each spatial position thereof periodically increases or decreases. FIGS. 17A to 17D illustrate a time variation of luminance of a background corresponding to two periods. In the diagrams, an abscissa represents a frame number of an image (a video) displaying the background, and an ordinate represents a relative luminance value (a function value of a time variation function for obtaining a relative luminance value of the background with respect to each frame number) of the background. It should be noted that a relative luminance value of a background represents relative luminance value=(luminance of background of each frame−minimum luminance of background)/(maximum luminance of background−minimum luminance of background). As illustrated in the diagrams, over an entire background of which luminance periodically varies, the luminance may increase or decrease linearly (FIG. 17A), vary sinusoidally (FIG. 17B), vary in a triangular wave shape (FIG. 17C), or vary in a step-wise manner (FIG. 17D).

Figure 18:
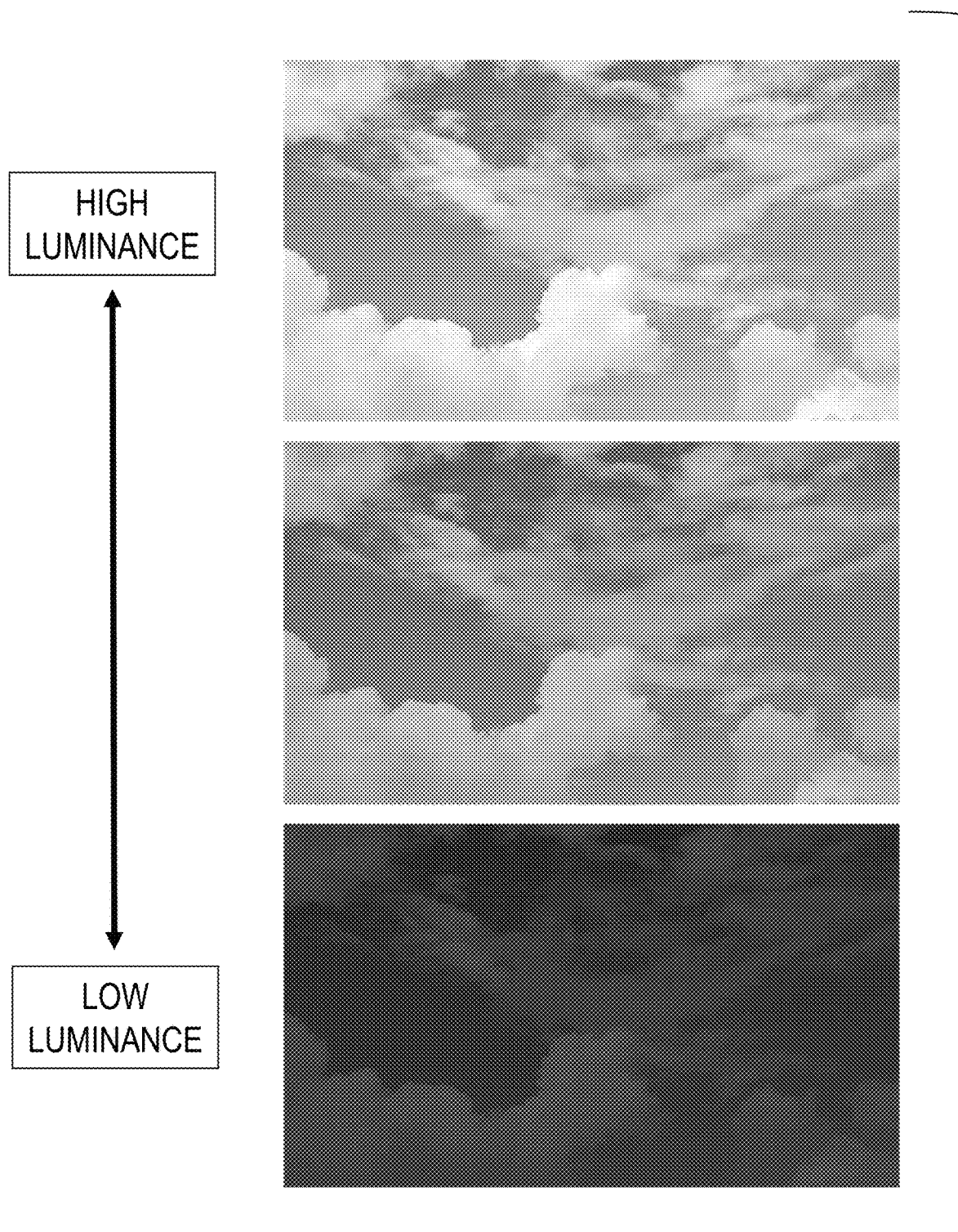
FIG. 18 is a diagram illustrating how luminance of a nonuniform background varies.

A background may be used which does not have a uniform luminance variation over the entire background but which causes luminance of an image that is not spatially uniform to periodically vary. For example, as illustrated in FIG. 18, a video that periodically increases or decreases luminance of an arbitrary image may be used as a background. Even in this case, each pixel value of the luminance of the arbitrary image may be linearly increased/linearly decreased, varied sinusoidally, varied in a triangular wave shape, or varied in a step-wise manner.

Figure 21:
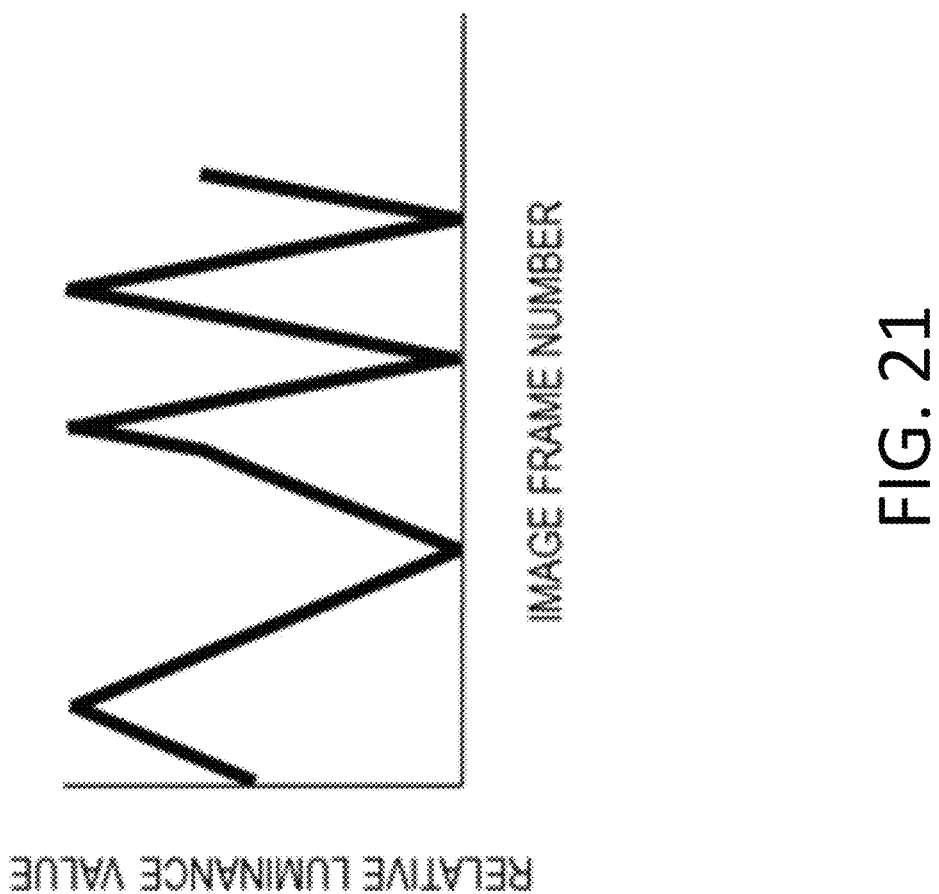
FIG. 21 is a diagram illustrating a period of the periodical variation of the luminance being switched to another period of each prescribed time.
Figure 22:
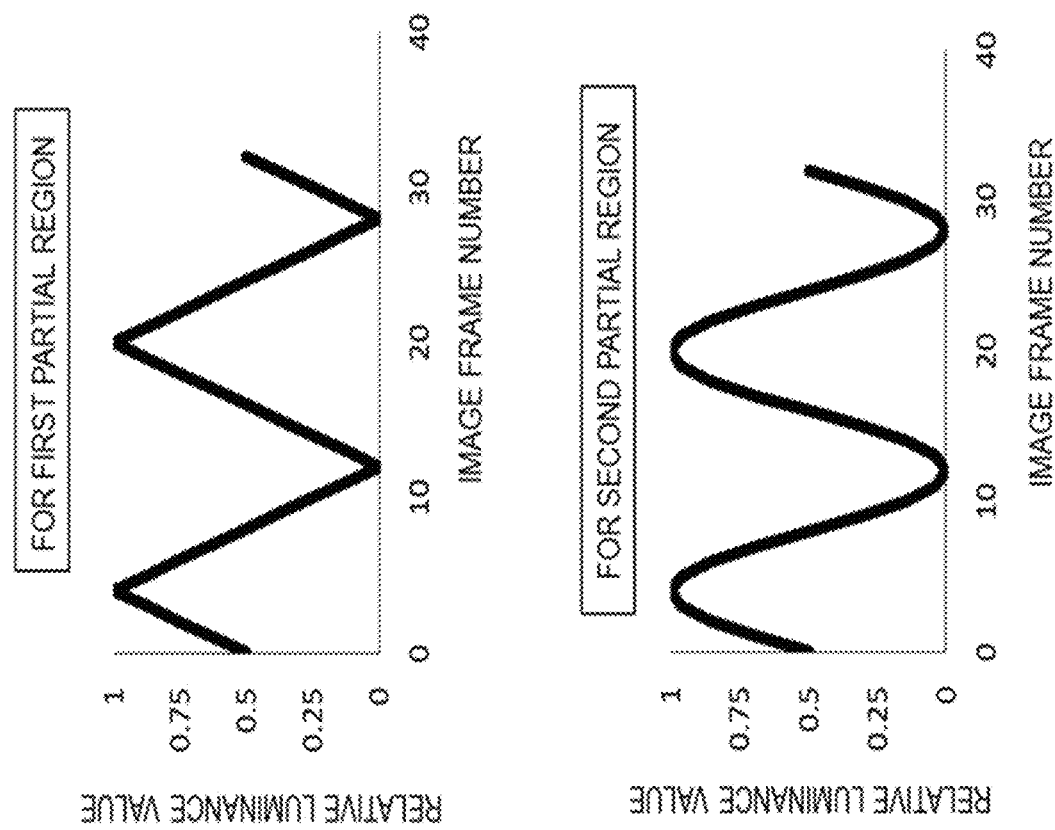
FIG. 22 is a diagram illustrating a periodical variation of the luminance in a region idffering from a periodical variation of the luminance in another region.

In addition, the periodical variation of the luminance of the background may include both a temporally periodical variation of the luminance and a spatially periodical variation of the luminance. In other words, the luminance of the background may also periodically vary in a spatial manner. The spatially periodical variation may be a spatially linear increase/linear decrease, a spatially sinusoidal variation, a spatial variation in a triangular wave shape, or a spatial variation on a rectangular wave. In addition, the periodical variation of the luminance may differ from one partial region (spatial region) to the next. For example, the background may include a "first partial region" and a "second partial region" that differs from the "first partial region", and a periodical variation of the luminance in the "first partial region" may differ from a periodical variation of the luminance in the "second partial region" as indicated in FIG. 22. Accordingly, a different motion can be caused to be perceived depending on a spatial position in a background in which the final target object O or the final target $O_S$ is arranged. In addition, a period of the periodical variation of the luminance may be switched to another period for each prescribed time as shown in FIG. 21. Accordingly, a different motion can be caused to be perceived for each prescribed time.

Figure 19:
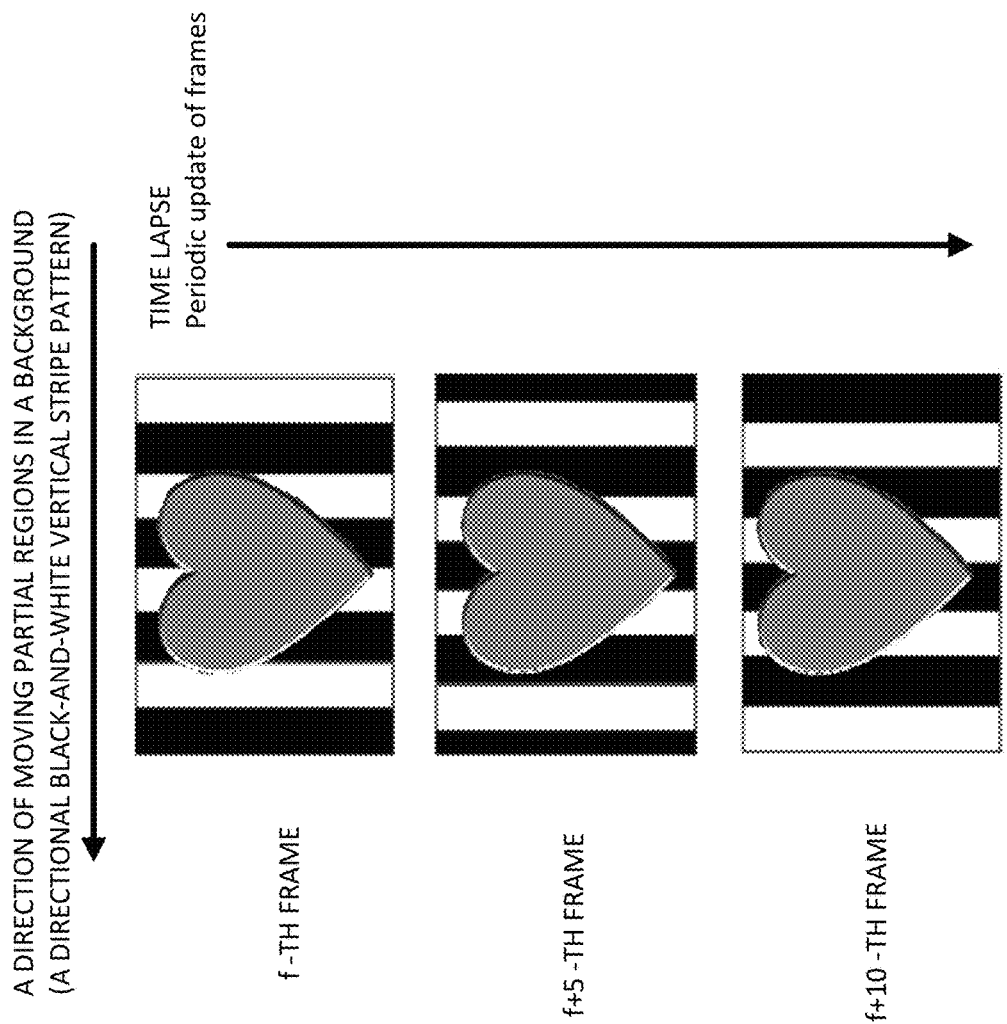
FIG. 19 is a diagram illustrating a background constituted by a video in which a directional black-and-white stripe pattern moves.

For example, as illustrated in FIG. 19, a video in which a directional black-and-white stripe pattern spatially moves may be used as a background. A maximum width of the black-and-white stripe pattern is desirably set to a visual angle of 0.2 degrees or more. For example, when it is assumed that the background is to be viewed from a position approximately 100 centimeters away, a width of a white stripe pattern and a width of a black stripe pattern are respectively set to approximately 3.5 millimeters or more. Let us assume that, in FIG. 19, an orientation of a vertical stripe pattern is defined as 0 degrees and an orientation of a horizontal stripe pattern is defined as 90 degrees. When it is assumed that the present technique causes the target to appear to move in a horizontal direction, the orientation of the stripe pattern is set between 0 degrees and 45 degrees. In addition, when it is assumed that the present technique causes the target to appear to move in a vertical direction, the orientation of the stripe pattern is set between 45 degrees and 90 degrees. In other words, a moving image which moves a stripe pattern that is tilted by less than 45 degrees relative to a grid or a stripe pattern which is perpendicular to an axis of an assumed motion of a target may be used as a background. While a stripe pattern that spatially varies in a step-wise manner is used in FIG. 19, a stripe pattern of which luminance increases or decreases spatially linearly may be moved, a stripe pattern of which luminance varies sinusoidally may be moved, or a stripe pattern of which luminance varies in a triangular wave shape may be moved.

Ninth Embodiment

In a ninth embodiment, a field of application of the present technique will be exemplified.

For example, by using the present technique, an illusory motion can be imparted to a letter or a character that is actually stationary. By many a light source of which luminance periodically varies with a translucent plate, printing a composited target image $M_S$ on the translucent plate, and arranging a final target object O (a target object) cut out along a contour of the final target $O_S$, motion can be imparted to the final target $O_S$. At this point, when the translucent plate is sufficiently larger than the final target object O, motions can be simultaneously imparted so as to give an observer an illusion that the final target objects O appear to be moving in plurality. A photograph or a picture may be printed on the translucent plate described above as long as the photograph or the picture transmits light. In this case, each final target object O may cause the observer to perceive any of the parallel movement illusion presented in the first and second embodiments and the modifications thereof, the rotation illusion presented in the third embodiment, the enlargement/reduction illusion presented in the fourth embodiment, and the illusion of movement of a part presented in the fifth embodiment. In addition, the observer may be caused to perceive a similar motion by the final target object O or the observer may be caused to perceive a plurality of motions by the final target object O as presented in the sixth embodiment and the third modification of the seventh embodiment. As long as the observer is caused to perceive that a background is present behind the final target object O, the final target object O may be separated (in a depth direction as viewed from the observer) from the background. For example, a final target object O separated from the background may be arranged between the observer and the background. For example, when the background is to be displayed on a transparent display, the background with a transparent feel which is displayed by the transparent display may be arranged between the observer and the final target object O.

A background of which luminance periodically varies may be displayed with an electronic paper that is capable of blinking. For example, let us consider a case where the present technique is to be implemented at a dark location. When a light source with high maximum luminance is used in order to mount a background of which luminance periodically varies, time-average luminance of the background rises and the final target object O becomes relatively darker. In this case, the "optimal luminance condition" described earlier cannot be satisfied and it becomes difficult to give the observer an illusion that the target $O_T$ appears to be moving. On the other hand, in the case of electronic paper, the electronic paper itself does not emit light and adopts brightness in accordance with ambient light in a similar manner to ordinary paper. Therefore, by using an electronic paper that is capable of blinking as a background of which luminance periodically varies, the "optimal luminance condition" may be more readily satisfied in dark locations as well as light locations.

Figure 20A:
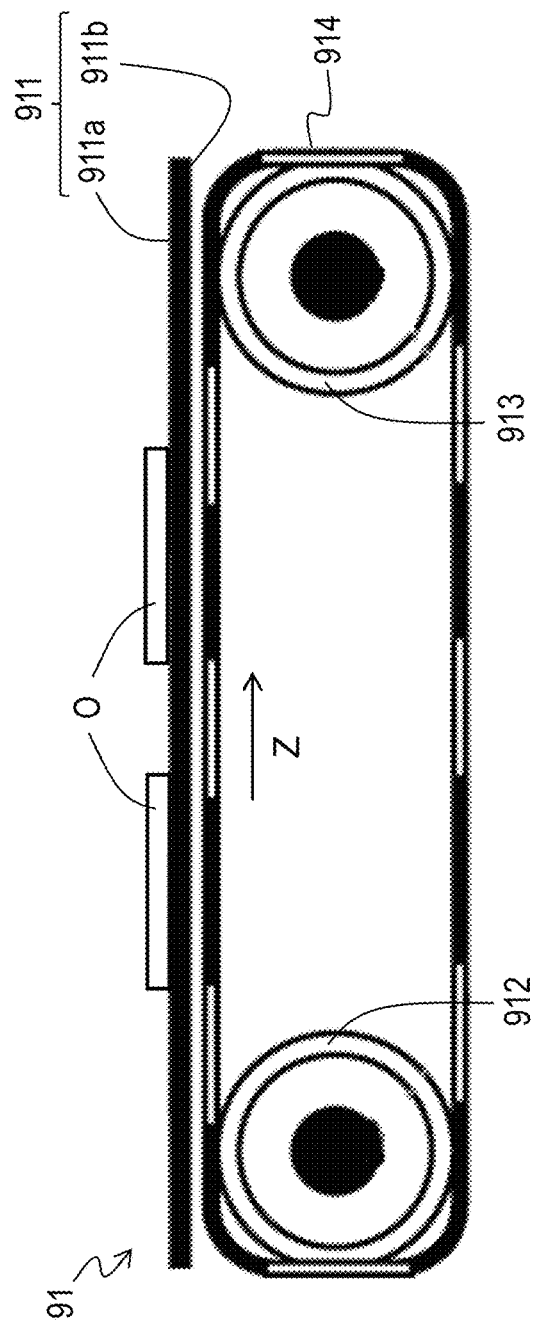
FIGS. 20A and 20B are diagrams illustrating a configuration in which feeding a stripe pattern by a roller causes luminance of a background to periodically vary.
Figure 20B:
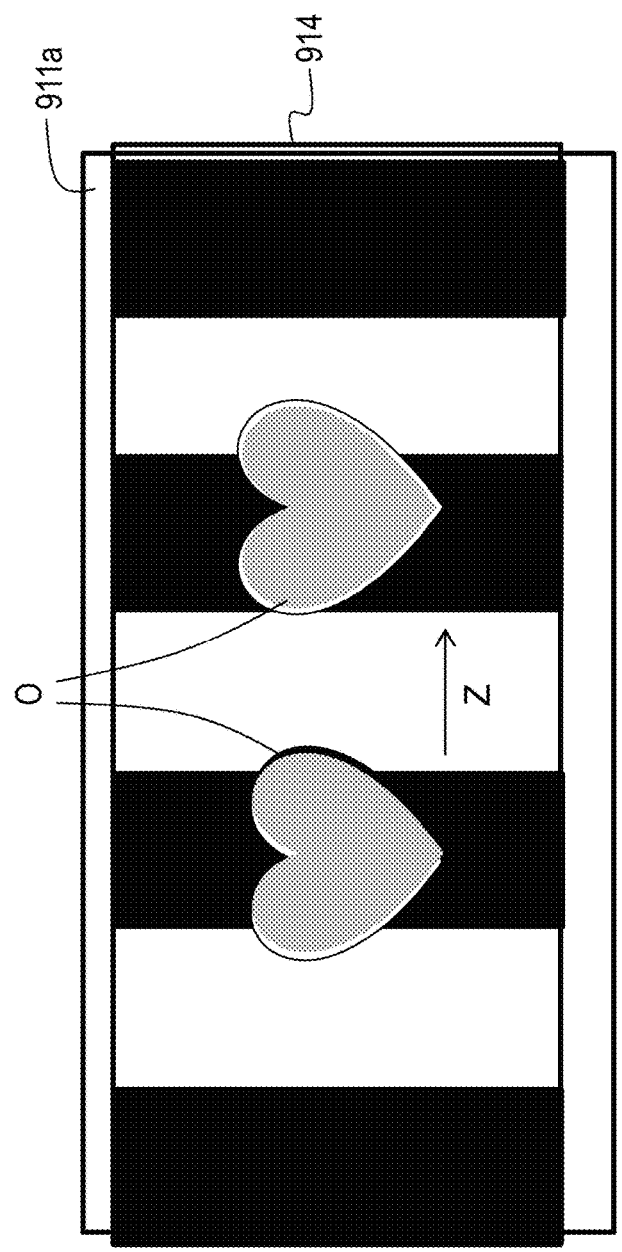

An illusion apparatus 91 illustrated in FIGS. 20A and 20B may be provided. The illusion apparatus 91 has a transparent plate 911 made of glass, plastic, or the like, rollers 912 and 913, a sheet 914, and a final target object O. The sheet 914 is a member with an endless belt shape in which a black-and-white stripe pattern (FIG. 19) illustrated in the eighth embodiment is printed on cloth, paper, or the like. The two rollers 912 and 913 are arranged so that respective axial centers thereof are parallel to each other and indicate an inner side of the sheet 914 with an endless belt shape. Driving the rollers 912 and 913 causes the sheet 914 to be fed out in a Z-direction. In this example, a direction of the stripe pattern (a longitudinal direction of each stripe) of the sheet 914 is approximately perpendicular to the Z-direction. The transparent plate 911 is arranged approximately parallel to one outer surface of the sheet 914. One surface 911b of the transparent plate 911 is arranged on a side of the sheet 914, and the final target object O is arranged on another surface 911a. In this state, when the rollers 912 and 913 feed out the sheet 914, the black-and-white stripe pattern appears to move in the Z-direction. An observer viewing the final target object O arranged on the transparent plate 911 in this state gets an illusion as though the final target object O is moving.

An effect of the present technique is produced even when the final target object O is arranged on a white surface such as a projector screen and projecting a video of which luminance periodically varies on the white surface on which the final target object O is arranged using a video projector. In this case, light having average luminance of the video illuminates the final target object O. The video projected from the video projector may be a video having spatially uniform luminance, a video in which luminance of an arbitrary image is temporally modulated, or a video of a moving black-and-white stripe pattern. In addition, a black-and-white grid pattern may be used in place of the black-and-white stripe pattern described above.

Other Modifications

The present invention is not limited to the embodiments described above. For example, in the image generation processes according to the embodiments and the modifications thereof, a process by a moving unit is performed after a process by a luminance operating unit. However, there is no limit to how the moved dark object image $M'_D$ and the moved light object image $M'_L$ are obtained from the target image $M_T$, and the moved dark object image $M'_D$ and the moved light object image $M'_L$ may be obtained by performing the process by the luminance operating unit after the process by the moving unit or by simultaneously performing the process by the luminance operating unit and the process by the moving unit.

In addition, in steps S112 and S113 of the first embodiment, an example is described in which a movement amount of the moved dark object $O'_D$ with respect to the dark object $O_D$ is the same as a movement amount of the moved light object $O'_L$ with respect to the light object $O_L$. However, the movement amount of the moved dark object $O'_D$ with respect to the dark object $O_D$ need not be the same as the movement amount of the moved light object $O'_L$ with respect to the light object $O_L$. Specifically, instead of inputting a vector (Dx, Dy) as a movement amount D to the moving units 112 and 113, a vector $D_1=(D_1x, D_1y)$ included in the movement amount D may be input to the moving unit 112 and a vector $D_2=(D_2x, D_2y)$ which is included in the movement amount D (and which differs from $D_1$) may be input to the moving unit 113, where $D_1x$ and $D_1y$ are arbitrary real numbers, $D_2x=-\gamma \times D_1x$, $D_2y=-\gamma \times D_1y$, and $\gamma$ is a positive value other than 1. In addition, a region created after the moving unit 112 moves each pixel of the dark object $O_D$ by the vector $D_1$ may be adopted as the moved dark object $O'_D$ and a region created after the moving unit 113 moves each pixel of the dark object $O_D$ by the vector $(D_2x, D_2y)$ may be adopted as the moved dark object $O'_D$.

In step S122 of the first embodiment, the fabricating unit 122 cuts a region where the final target $O_S$ has been printed from the printed object $PM_S$ along a contour line of the final target $O_S$ to obtain a final target object O having approximately the same contour as the contour of the final target $O_S$. However, when the printing unit 121 prints the composited target image $M_S$ obtained by the image generation apparatus 11 on a flat surface of a transparent or translucent object (such as glass or synthetic resin) to obtain the printed object $PM_S$ in step S121, a region where the final target $O_S$ has been printed need not be cut out from the printed object $PM_S$. In this case, the printed object $PM_S$ on which the composited target image $M_S$ has been printed may be arranged, without modification, on a background of which luminance periodically varies. The illusions described above can also be created by this method.

In addition, the composition process is not limited to the methods according to the embodiments described above and the composited target image $M_S$ may be obtained by other processes as long as the same composited target image $M_S$ is obtained as a result.

A single apparatus may be equipped with a function of an image generation apparatus and a function of an object generation apparatus, or the function of an image generation apparatus can be distributed and arranged across a plurality of apparatuses. In addition, a single apparatus may be equipped with functions of image generation apparatuses according to any plurality of the embodiments described above.

The various processes described above may not only be executed in chronological order according to the descriptions but may also be executed in parallel or individually in accordance with processing capabilities of an apparatus to be used to execute the processes or as may be necessary. Furthermore, it is needless to say that the present invention can be appropriately modified without departing from the scope and spirit of the invention.

SUMMARY

The embodiments described above will now be summarized.

In the first embodiment, an image generation apparatus 11 obtains an image including a dark object $O_D$ of which luminance is lower than a target $O_T$ and an image including a light object $O_L$ of which luminance is higher than the target $O_T$, obtains an image including a moved dark object $O'_D$ obtained by moving the dark object $O_D$ in parallel in a first direction and an image including a moved light object $O'_L$ obtained by moving the light object $O_L$ in parallel in a second direction that is an opposite direction to the first direction, and performs layer composition of an image including the target $O_T$, the image including the moved dark object $O'_D$, and the image including the moved light object $O'_L$ to obtain a composited target image $M_S$. In addition, in the second embodiment, an image generation apparatus 21 composites an additional dark region $aO_D$ which is included in the moved dark object $O'_D$ but not included in the target $O_T$, an additional dark region $aO_L$ which is included in the moved light object $O'_L$ but not included in the target $O_T$, and a region of the target $O_T$ instead of performing the layer composition according to the first embodiment to obtain the composited target image $M_S$. Furthermore, in the third embodiment, an image generation apparatus 11" obtains an image including the moved dark object $O'_D$ obtained by rotationally moving the dark object $O_D$ in a first rotation direction and an image including the moved light object $O'_L$ obtained by rotationally moving the light object $O_L$ in a second rotation direction that is an opposite direction to the first rotation direction instead of performing the parallel movement according to the first or second embodiment, and composites an image including the target $O_T$, the image including the moved dark object $O'_D$, and the image including the moved light object $O'_L$ to obtain the composited target image $M_S$. In other words, the image generation apparatuses 11, 21, and 11" generate the composited target image $M_S$ by a composition process in which composition (layer composition) of the target $O_T$, the dark object $O_D$, and the light object $O_L$ having approximately the same shape is performed based on three images which respectively include the target $O_T$, the dark object $O_D$, and the light object $O_L$. However, luminance of the dark object $O_D$ is lower than luminance of the target $O_T$, and luminance of the light object $O_L$ is higher than the luminance of the target $O_T$. In addition, the composition process is a process of obtaining an image which is equivalent to an image including an "object" obtained by an "incomplete superposition" in which a part of the dark object $O_D$ and a part of the light object $O_L$ are hidden by the target $O_T$. Furthermore, an object generation apparatus 12 generates a printed object $PM_S$ of the composited target image $M_S$ obtained by the image generation apparatuses 11, 21, and 11" (the composition processing unit), and cuts out a portion corresponding to a final target $O_S$ from the printed object $PM_S$ to obtain a final target object O. The final target object O includes the final target $O_S$ which is equivalent to an "object" obtained by a superposition (an "incomplete superposition") of the three objects of the target $O_T$, the dark object $O_D$, and the light object $O_L$ with approximately the same shape. In other words, the final target object O (object) is configured to include a luminance region that is equivalent to an incomplete superposition of three objects which have approximately the same contour shape and of which luminance differs from each other. The final target object O is arranged on a background BG (a background object) of which luminance periodically varies. An observer viewing the situation has an illusion that the target $O_T$ which should not be moving appears to move in parallel on the background BG. In this manner, in the present embodiment, in addition to a rectangular target such as that described in NPL1, an illusion that a target $O_T$ which should not be moving appears to move can be created regardless of how complex a contour shape of the target $O_T$ is.

In the second modification of the first embodiment and the modifications in which the second and third embodiments are modified in a similar manner thereto, the image generation apparatuses 11, 21, and 11" obtain a presentation image $M_B$ by performing layer composition of the final target $O_S$ of the composited target image $M_S$ on an image $B_V$ of a background of which luminance periodically varies and output the presentation image $M_B$. In other words, the presentation image $M_S$ constituted by the final target $O_S$ which is equivalent to an object obtained by an "incomplete superposition" among the composited target image $M_S$ obtained by the image generation apparatuses 11, 21, and 11" (the composition processing unit) and a background of which luminance periodically varies over time may be presented from a display unit. The image generation apparatuses 11, 21, and 11" may include such a display unit. An observer viewing such a presentation image $M_B$ also has an illusion that the target $O_T$ which should not be moving appears to move. Examples of such illusion are shown in FIGS. 5, 6A, 6B, 9A, 9B, 14A, and 14B.

In the fourth and fifth embodiments, image generation apparatuses 41, 42, 51, and 52 generate a composited target image by a composition process in which the target $O_T$ and the dark object $O_D$ having approximately the same shape or approximately similar shapes are composited based on two images respectively including the target $O_T$ and the dark object $O_D$ or a composition process in which the target $O_T$ and the light object $O_L$ having approximately the same shape or approximately similar shapes are composited based on two images respectively including the target $O_T$ and the light object $O_L$. However, these composition processes are processes of obtaining an image which is equivalent to an image including an object obtained by an incomplete superposition in which a part of the dark object $O_D$ is hidden by the target $O_T$ or an incomplete superposition in which a part of the light object $O_L$ is hidden by the target $O_T$. Furthermore, the object generation apparatus 12 generates a printed object $PM_S$ of the composited target image $M_S$ obtained by the image generation apparatuses 41, 42, 51, and 52 (the composition processing unit), and cuts out a portion corresponding to the final target $O_S$ from the printed object $PM_S$ to obtain the final target object O. The final target object O (object) is configured to include a superposition of two objects which have approximately the same contour shape or approximately similar contour shapes and of which luminance differs from each other or a luminance region that is equivalent to a superposition of the two objects. The final target object O is arranged on a background BG (a background object) of which luminance periodically varies. Alternatively, an image is presented which is constituted by a final target that is equivalent to an object obtained by a superposition of two objects of the target $O_T$ and the dark object $O_D$ with approximately the same shape or approximately similar shapes or a superposition of two objects of the target $C_T$ and the light object $O_L$ with approximately the same shape or approximately similar shapes and a background of which luminance periodically varies over time.

In modifications in which the fourth and fifth embodiments are modified in a similar manner to the second modification of the first embodiment, the image generation apparatuses 41, 42, 51, and 52 obtain a presentation image $M_B$ by performing layer composition of the final target $O_S$ of the composited target image $M_S$ on an image By of a background of which luminance periodically varies and output the presentation image $M_B$. In other words, the presentation image $M_S$ constituted by the final target $O_S$ which is equivalent to an object obtained by an "incomplete superposition" among the composited target image $M_S$ obtained by the image generation apparatuses 41, 42, 51, and 52 (the composition processing unit) and a background of which luminance periodically varies over time is obtained. An observer viewing such a presentation image $M_B$ also has an illusion that the target $O_T$ which should not be moving appears to move as shown in FIGS. 14A and 14B.

In addition, an object set such as that described in the seventh embodiment and the first, second, and third modifications thereof may be provided. In other words, an object set including three objects which have approximately the same contour shape and of which luminance differs from each other to be incompletely superimposed and arranged on a background object of which luminance periodically varies may be provided. Alternatively, an object set including two objects which have approximately the same contour shape or approximately similar contour shapes and of which luminance differs from each other to be incompletely superimposed and arranged on a background object of which luminance periodically varies may be provided. Alternatively, an object may be provided which is configured to include an incomplete superposition of three objects which have approximately the same contour shape and of which luminance differs from each other or a luminance region that is equivalent to the incomplete superposition of the three objects to be arranged on a background object of which luminance periodically varies. Alternatively, an object may be provided which is configured to include a superposition of two objects which have approximately the same contour shape or approximately similar contour shapes and of which luminance differs from each other or a luminance region that is equivalent to the superposition of the two objects to be arranged on a background object of which luminance periodically varies.

[Specific Configuration Method of Apparatus]

The respective apparatuses described above are configured by, for example, having a general-purpose computer or a dedicated computer equipped with a processor (a hardware processor) such as a CPU (central processing unit), a memory such as a RAM (random-access memory) or a ROM (read-only memory), and the like execute a prescribed program. The computer may be equipped with one processor and one memory or a plurality of processors and a plurality of memories. The program may be installed on the computer or may be recorded in advance in a ROM or the like. In addition, a part of or all of the processing units may be configured using circuitry that realizes a processing function without using a program instead of circuitry such as a CPU that realizes a processing function when a program is loaded. Circuitry constituting one apparatus may include a plurality of CPUs.

When realizing the configurations described above with a computer, processing contents of a function which each apparatus must be equipped with are described by a program. The processing functions described above are realized on the computer by having the computer execute the program. The program describing the processing contents can be recorded in a computer-readable recording medium. An example of the computer-readable recording medium is a non-transitory recording medium. Examples of such a recording medium include a magnetic recording apparatus, an optical disk, a magneto-optical recording medium, and a semiconductor memory.

The program is distributed by, for example, selling, transferring, or lending a portable recording medium such as a DVD or a CD-ROM on which the program is recorded. Furthermore, a configuration may be adopted in which the program is stored in a storage apparatus of a server computer and the server computer transmits the program to other computers via network in order to distribute the program.

For example, a computer that executes such a program first temporarily stores a program recorded in a portable recording medium or a program transmitted from a server computer in its own storage apparatus. When executing processing, the computer reads the program stored in its own storage apparatus and executes processing in accordance with the read program. As an alternative execution mode of the program, a computer may read a program directly from a portable recording medium and execute processing in accordance with the program or, every time the program is transmitted from a server computer to the computer, the computer may execute processing in accordance with the received program. A configuration may be adopted in which a program is not transmitted to the computer from a server computer and the processing described above is executed by a so-called ASP (Application Service Provider)-type service which executes a processing function only by issuing an execution instruction and acquiring a result thereof.

Instead of executing a prescribed program on a computer to realize processing functions of the present apparatus, at least a part of the processing functions may be realized by hardware.

REFERENCE SIGNS LIST

11, 11', 21, 41, 42, 51, 52, 61 Image generation apparatus
12 Object generation apparatus
13 Illusion apparatus

The invention claimed is:

1. An illusion apparatus for causing an illusion that an object which is not actually moving is perceived to be moving,
   the illusion apparatus comprising a final target object including a final target that is equivalent to an object obtained by superposition of three objects of a target, a dark object, and a light object which have approximately a same shape, wherein
   the final target object is arranged in a background of which luminance periodically varies over time,
   luminance of the dark object is lower than luminance of the target,
   luminance of the light object is higher than the luminance of the target, and
   the superposition is an incomplete superposition in which a part of the dark object and a part of the light object are hidden by the target, wherein
   luminance of the background also periodically varies in a spatial manner.

2. An illusion apparatus for causing an illusion that an object which is not actually moving is perceived to be moving,
   the illusion apparatus comprising a final target object including a final target that is equivalent to an object obtained by superposition of three objects of a target, a dark object, and a light object which have approximately a same shape, wherein
   the final target object is arranged in a background of which luminance periodically varies over time,
   luminance of the dark object is lower than luminance of the target,
   luminance of the light object is higher than the luminance of the target, and
   the superposition is an incomplete superposition in which a part of the dark object and a part of the light object are hidden by the target, wherein
   a period of the periodical variation of the luminance is switched to another period for each prescribed time.

3. An illusion apparatus for causing an illusion that an object which is not actually moving is perceived to be moving,
   the illusion apparatus comprising a final target object including a final target that is equivalent to an object obtained by superposition of three objects of a target, a dark object, and a light object which have approximately a same shape, wherein
   the final target object is arranged in a background of which luminance periodically varies over time,
   luminance of the dark object is lower than luminance of the target,
   luminance of the light object is higher than the luminance of the target, and
   the superposition is an incomplete superposition in which a part of the dark object and a part of the light object are hidden by the target, wherein the background includes a first partial region and a second partial region that differs from the first partial region, and a periodical variation of luminance in the first partial region differs from a periodical variation of luminance in the second partial region.

4. An illusion apparatus for causing an illusion that an object which is not actually moving is perceived to be moving, the illusion apparatus comprising a final target object including a final target that is equivalent to an object obtained by superposition of two objects of a target and a dark object which have approximately a same shape or approximately similar shapes or superposition of two objects of a target and a light object which have approximately the same shape or approximately similar shapes, wherein the final target object is arranged in a background of which luminance periodically varies over time, luminance of the dark object is lower than luminance of the target, luminance of the light object is higher than the luminance of the target, and the superposition is an incomplete superposition in which a part of the dark object is hidden by the target or an incomplete superposition in which a part of the light object is hidden by the target, wherein luminance of the background also periodically varies in a spatial manner.

5. An illusion apparatus for causing an illusion that an object which is not actually moving is perceived to be moving, the illusion apparatus comprising a final target object including a final target that is equivalent to an object obtained by superposition of two objects of a target and a dark object which have approximately a same shape or approximately similar shapes or superposition of two objects of a target and a light object which have approximately the same shape or approximately similar shapes, wherein the final target object is arranged in a background of which luminance periodically varies over time, luminance of the dark object is lower than luminance of the target, luminance of the light object is higher than the luminance of the target, and the superposition is an incomplete superposition in which a part of the dark object is hidden by the target or an incomplete superposition in which a part of the light object is hidden by the target, wherein a period of the periodical variation of the luminance is switched to another period for each prescribed time.

6. An illusion apparatus for causing an illusion that an object which is not actually moving is perceived to be moving, the illusion apparatus comprising a final target object including a final target that is equivalent to an object obtained by superposition of two objects of a target and a dark object which have approximately a same shape or approximately similar shapes or superposition of two objects of a target and a light object which have approximately the same shape or approximately similar shapes, wherein the final target object is arranged in a background of which luminance periodically varies over time, luminance of the dark object is lower than luminance of the target, luminance of the light object is higher than the luminance of the target, and the superposition is an incomplete superposition in which a part of the dark object is hidden by the target or an incomplete superposition in which a part of the light object is hidden by the target, wherein the background includes a first partial region and a second partial region that differs from the first partial region, and a periodical variation of luminance in the first partial region differs from a periodical variation of luminance in the second partial region.

7. An illusion apparatus for causing an illusion that an object which is not actually moving is perceived to be moving, the illusion apparatus comprising a display unit which presents an image constituted by a final target that is equivalent to an object obtained by superposition of three objects of a target, a dark object, and a light object which have approximately a same shape and a background of which luminance periodically varies over time, wherein luminance of the dark object is lower than luminance of the target, luminance of the light object is higher than the luminance of the target, and the superposition is an incomplete superposition in which a part of the dark object and a part of the light object are hidden by the target, wherein luminance of the background also periodically varies in a spatial manner.

8. An illusion apparatus for causing an illusion that an object which is not actually moving is perceived to be moving, the illusion apparatus comprising a display unit which presents an image constituted by a final target that is equivalent to an object obtained by superposition of two objects of a target and a dark object which have approximately a same shape or approximately similar shapes or superposition of two objects of a target and a light object which have approximately the same shape or approximately similar shapes and a background of which luminance periodically varies over time, wherein luminance of the dark object is lower than luminance of the target, luminance of the light object is higher than the luminance of the target, and the superposition is an incomplete superposition in which a part of the dark object is hidden by the target or an incomplete superposition in which a part of the light object is hidden by the target, wherein luminance of the background also periodically varies in a spatial manner.

9. An illusion apparatus for causing an illusion that an object which is not actually moving is perceived to be moving, the illusion apparatus comprising a display unit which presents an image constituted by a final target that is equivalent to an object obtained by superposition of three objects of a target, a dark object, and a light object which have approximately a same shape and a background of which luminance periodically varies over time, wherein luminance of the dark object is lower than luminance of the target, luminance of the light object is higher than the luminance of the target, and the superposition is an incomplete superposition in which a part of the dark object and a part of the light object are hidden by the target, wherein a period of the periodical variation of the luminance is switched to another period for each prescribed time.

10. An illusion apparatus for causing an illusion that an object which is not actually moving is perceived to be moving, the illusion apparatus comprising a display unit which presents an image constituted by a final target that is equivalent to an object obtained by superposition of two objects of a target and a dark object which have approximately a same shape or approximately similar shapes or superposition of two objects of a target and a light object which have approximately the same shape or approximately similar shapes and a background of which luminance periodically varies over time, wherein luminance of the dark object is lower than luminance of the target, luminance of the light object is higher than the luminance of the target, and the superposition is an incomplete superposition in which a part of the dark object is hidden by the target or an incomplete superposition in which a part of the light object is hidden by the target, wherein a period of the periodical variation of the luminance is switched to another period for each prescribed time.

11. An illusion apparatus for causing an illusion that an object which is not actually moving is perceived to be moving, the illusion apparatus comprising a display unit which presents an image constituted by a final target that is equivalent to an object obtained by superposition of three objects of a target, a dark object, and a light object which have approximately a same shape and a background of which luminance periodically varies over time, wherein luminance of the dark object is lower than luminance of the target, luminance of the light object is higher than the luminance of the target, and the superposition is an incomplete superposition in which a part of the dark object and a part of the light object are hidden by the target, wherein the background includes a first partial region and a second partial region that differs from the first partial region, and a periodical variation of luminance in the first partial region differs from a periodical variation of luminance in the second partial region.

12. An illusion apparatus for causing an illusion that an object which is not actually moving is perceived to be moving, the illusion apparatus comprising a display unit which presents an image constituted by a final target that is equivalent to an object obtained by superposition of two objects of a target and a dark object which have approximately a same shape or approximately similar shapes or superposition of two objects of a target and a light object which have approximately the same shape or approximately similar shapes and a background of which luminance periodically varies over time, wherein luminance of the dark object is lower than luminance of the target, luminance of the light object is higher than the luminance of the target, and the superposition is an incomplete superposition in which a part of the dark object is hidden by the target or an incomplete superposition in which a part of the light object is hidden by the target, wherein the background includes a first partial region and a second partial region that differs from the first partial region, and a periodical variation of luminance in the first partial region differs from a periodical variation of luminance in the second partial region.

* * * * *